(12) United States Patent
Tolan

(10) Patent No.: US 9,947,238 B2
(45) Date of Patent: Apr. 17, 2018

(54) MUSIC NOTATION SYSTEM

(71) Applicant: Zachary Ray Tolan, Grand Rapids, MI (US)

(72) Inventor: Zachary Ray Tolan, Grand Rapids, MI (US)

( * ) Notice: Subject to any disclaimer, the term of this patent is extended or adjusted under 35 U.S.C. 154(b) by 0 days.

(21) Appl. No.: 15/431,328

(22) Filed: Feb. 13, 2017

(65) Prior Publication Data

US 2017/0236443 A1  Aug. 17, 2017

Related U.S. Application Data

(60) Provisional application No. 62/295,322, filed on Feb. 15, 2016.

(51) Int. Cl.
| | |
|---|---|
| *G09B 15/02* | (2006.01) |
| *G09B 15/00* | (2006.01) |
| *G10G 1/04* | (2006.01) |
| *G09B 15/08* | (2006.01) |

(52) U.S. Cl.
CPC ......... *G09B 15/023* (2013.01); *G09B 15/003* (2013.01); *G09B 15/009* (2013.01); *G10G 1/04* (2013.01); *G09B 15/08* (2013.01)

(58) Field of Classification Search
CPC .. G09B 15/023; G09B 15/003; G09B 15/009; G09B 15/08
USPC ....................................................... 84/482.3
See application file for complete search history.

(56) References Cited

U.S. PATENT DOCUMENTS

| | | | | |
|---|---|---|---|---|
| 438,429 | A | * | 10/1890 | Clemons ................ G09B 15/02 |
| | | | | 84/471 R |
| 602,862 | A | | 5/1898 | Marcuson |
| 830,915 | A | | 9/1906 | Meyers |
| 1,300,139 | A | | 4/1919 | Raff |
| 1,473,495 | A | * | 11/1923 | Miller .................... G09B 15/00 |
| | | | | 84/428 |
| 1,509,320 | A | | 9/1924 | Schneider |
| 1,556,147 | A | | 10/1925 | Johnson et al. |
| 2,188,098 | A | | 1/1940 | Bostelmann, Jr. |
| 2,254,547 | A | | 9/1941 | Rupp |

(Continued)

OTHER PUBLICATIONS

Drtechdaddy, A shape-notation for a Janko keyboard, Sep. 5, 2015, www.drtechdaddy.com/2015/09/05/a-shape-note-notation-for-a-janko-keyboard/ , captured Nov. 7, 2016.

(Continued)

*Primary Examiner* — Robert W Horn
(74) *Attorney, Agent, or Firm* — Hultman Law, PLC; Eric Andrew Hultman, Esq.

(57) ABSTRACT

The invention disclosed herein comprises a method for visually representing music to be played on a musical instrument by providing a tablature staff which is divided into individual measures by segmenting the tablature staff with measure lines. Each measure is then further divided into proportional time subdivisions using subdivision lines. Alphanumeric notes are then printed between these subdivision lines on the tablature staff, wherein each alphanumeric note represents a tone to be played on a musical instrument and wherein the duration of each alphanumeric note is indicated by the number of time subdivisions within a measure and its corresponding font size.

48 Claims, 16 Drawing Sheets

(56) References Cited

U.S. PATENT DOCUMENTS

| | | | | |
|---|---|---|---|---|
| 2,271,772 A * | 2/1942 | Maffei | ............... | G10G 1/00 |
| | | | | 84/483.1 |
| 2,360,534 A * | 10/1944 | Allen | ............... | G10G 1/02 |
| | | | | 84/483.1 |
| 2,788,699 A | 4/1957 | Pipkin | | |
| 2,814,231 A | 11/1957 | Jones | | |
| 3,218,904 A | 11/1965 | Hartman | | |
| 3,245,303 A | 4/1966 | Patt | | |
| 3,712,167 A | 1/1973 | Renault | | |
| 3,820,434 A | 6/1974 | Roberts | | |
| 3,827,330 A | 8/1974 | Ward | | |
| 4,361,070 A | 11/1982 | Huiner | | |
| 4,559,861 A | 12/1985 | Patty et al. | | |
| 4,671,159 A | 6/1987 | Stark | | |
| 5,945,618 A | 8/1999 | Bennett | | |
| 6,127,616 A * | 10/2000 | Yu | ............... | G09B 15/026 |
| | | | | 84/483.1 |
| 6,218,603 B1 | 4/2001 | Coonce | | |
| 6,288,316 B1 | 9/2001 | Fajardo | | |
| 6,388,182 B1 | 5/2002 | Bermudez | | |
| 6,452,080 B1 | 9/2002 | Coonce | | |
| 6,476,303 B1 | 11/2002 | Mutou et al. | | |
| 6,483,018 B2 | 11/2002 | Mead | | |
| 6,660,921 B2 | 12/2003 | Deverich | | |
| 6,881,887 B2 | 4/2005 | Berens | | |
| 6,977,334 B2 | 12/2005 | Kimbrough | | |
| 6,987,220 B2 * | 1/2006 | Holcombe | ............... | G09B 15/026 |
| | | | | 84/483.2 |
| 7,098,392 B2 | 8/2006 | Sitrick et al. | | |
| 7,241,945 B1 | 7/2007 | Egan | | |
| 7,482,525 B2 | 1/2009 | Reverdin | | |
| 7,663,044 B2 | 2/2010 | Katsuta | | |
| 7,674,965 B2 * | 3/2010 | Mataele | ............... | G09B 15/023 |
| | | | | 84/483.2 |
| 7,750,224 B1 | 7/2010 | Rav-Niv et al. | | |
| 7,767,895 B2 * | 8/2010 | Johnston | ............... | G09B 15/02 |
| | | | | 84/470 R |
| 7,777,117 B2 | 8/2010 | Salter | | |
| 7,910,818 B2 | 3/2011 | Kim et al. | | |
| 8,039,721 B2 | 10/2011 | Wold | | |
| 8,445,767 B2 | 5/2013 | Brow et al. | | |
| 8,664,502 B2 | 3/2014 | Kellner | | |
| 8,669,455 B2 * | 3/2014 | Skaggs | ............... | G09B 15/026 |
| | | | | 84/470 R |
| 8,686,269 B2 | 4/2014 | Schmidt et al. | | |
| 8,704,066 B2 | 4/2014 | Jacobsen | | |
| 8,716,583 B2 * | 5/2014 | Forrest | ............... | G10C 3/12 |
| | | | | 84/470 R |
| 8,835,736 B2 * | 9/2014 | Parks | ............... | G10H 1/368 |
| | | | | 84/477 R |
| 8,835,737 B2 * | 9/2014 | King | ............... | G09B 15/023 |
| | | | | 84/471 R |
| 2014/0260898 A1 * | 9/2014 | Bales | ............... | G09B 15/026 |
| | | | | 84/433 |
| 2015/0107441 A1 * | 4/2015 | Kuo | ............... | G09B 15/02 |
| | | | | 84/483.2 |
| 2017/0236443 A1 * | 8/2017 | Tolan | ............... | G09B 15/023 |
| | | | | 84/483.2 |

OTHER PUBLICATIONS

Various, Klavarskribo, en.wikipedia.org/wiki/Klavarskribo , captured Nov. 7, 2016.

Unknown, LilyPond snippets: Fretted Strings, lilypond.org/doc/v2.18/Documentation/snippets/fretted-strings , captured Nov. 7, 2016.

Budynek, Aurelien; Rhythm-Rules, Jul. 2013, www.premierguitar.com/ext/resources/images/content/2014-04/LESS/Rhythm-Rules/Apr14_LESS_RhythmRules_Ex-7.jpg, captured Nov. 7, 2016.

* cited by examiner

MUSIC NOTATION SYSTEM

CROSS REFERENCE TO RELATED APPLICATION

This application is a non-provisional application claiming priority to an earlier filed U.S. provisional patent application entitled, "Music Notation system," filed Feb. 15, 2016, and assigned Ser. No. 62/295,322 the contents of which are incorporated herein by reference.

BACKGROUND OF THE INVENTION

Field of the Invention

The present invention generally relates to a system for music notation, more specifically to methods for music tablature and particularly to tablature methods wherein the duration of notes is indicated by the font size of an alphanumeric note.

Description of the Related Art

Standard musical notation typically represents the rhythm and duration of a set of musical notes by indicating their pitch on a staff further specified by a clef, usually with a time signature and key signature, whose pitches are further modifiable by the use of accidentals. In contrast to the standard form musical notation, an alternative form of notation has arisen that is often called tablature notation. The general premise of tablature notation differs from standard musical notation because it does not indicate a note's pitch, but rather indicates a specific location on an instrument (such '5', indicating the $5^{th}$ fret), without specifying the positioning of the hand, the finger to be used, or the posture (spacing) of the fingers on the instrument. These representations of locations on an instrument generally indicate, but do not fully specify, the mechanical operations to be performed on the instrument, and these representations stand in for the musical notes of standard musical notation. However, the main difference between conventional tablature and conventional standard music notation is that conventional tablature does not convey any information concerning pitch.

Since prior art tablature methods represent mechanical operations on the instrument, it makes sense for the tablature representation to visually recreate a physical portion of a physical instrument. Prior art tablature methods for keyboards typically represents a portion of a keyboard, whereas tablature for a stringed instrument typically depicts an instrument's strings. In each case the tablature then indicates the key or string to manipulate. In cases of instruments such as woodwinds, their tablature shows the particular key holes of the instrument to open or close to perform a particular note.

The chief advantage of tablature, as compared to conventional musical notation, is that the tablature describes the operations to be played on an instrument, allowing them to be played without need for traditional music notation. Using tablature, the musician is shown the specific set of operations in lieu of the pitches of the notes. In comparison, with pitch-based standard musical notation the musician must often interpret various fingering possibilities when a pitch can be rendered in more than one location on an instrument. For example, on a guitar in standard tuning, the note "C" could be played on the B string on the first fret, or on the G string at the fifth fret. In standard notation, the note is simply represented as the pitch C, while string, finger posture, and hand position determinations are interpreted by the musician. In prior art tablature, the string and fret position is specified, thus, tablature is more specific in this regard.

However, standard tablature notation has several disadvantages, chiefly that it does not indicate hand positioning or finger posture (finger spacing). In addition, polyphony, or multiple simultaneous musical voices, are not distinguished. Further, the play-style is not represented in the alphanumeric characters of prior art tablature notation. Furthermore, standard tablature is specific to one instrument and is difficult to translate, for instance from violin to cello, without first translating the music into standard pitch-based notation. This limits a student using prior art tablature to a particular instrument and makes translation to another musical instrument painstaking.

Prior art tablature replaces the information regarding the duration and timing of notes with fingering or operation information necessary to perform the note, therefore the rhythm and timing of the notes is only loosely provided, usually requiring tablature to be placed adjacent to rhythm indicators of standard musical notation. This forces the user of standard tablature to either guess at the intent of the composer, or to have a preconceived notion of the timing of the notes when reading unaccompanied tablature. Alternatively, the user is forced to simultaneously interpret both the traditional musical notation and the tablature to correctly render the musical information. Attempts to convey this information, such as by adding flags and stems to the tablature, long for improvement, especially in the form of enhanced precision and simplification.

The invention described herein solves these disadvantages by providing a method for musical notation wherein the duration of notes is indicated by the font size of an alphanumeric note in conjunction with a tone extension symbol providing rhythmic information to the musician using a newly invented tablature format. Additionally, the system described herein indicates the intended string, and explicitly provides the fingering and its posture. Further, this novel system renders alphanumeric notes isomorphically so that the selected font visually represents an articulated play style. Moreover, the alphanumeric notes may be color coded to distinguish polyphonic voices. These advantages and more are presented in further detail herein.

SUMMARY OF THE INVENTION

The inventive musical notation system contains a method for visually representing music to be played on a musical instrument and comprises the steps of providing a tablature staff representing a portion of a musical instrument. This tablature staff is then divided into individual measures by segmenting the tablature staff with measure lines, wherein each measure line is thicker or darker than a set of subdivision lines which further divide the measures into equally proportioned subdivisions.

Once the tablature is constructed, a plurality of alphanumeric notes is printed on the tablature staff. The alphanumeric notes are placed into the equally proportioned subdivisions between the subdivision lines. Each alphanumeric note printed thereon represents a tone to be played on a corresponding musical instrument. The duration of the tone for each alphanumeric note is indicated by the font size of the alphanumeric notes relative to the equally proportioned subdivisions, i.e., the spacing between a measure's subdivision lines. Full-size alphanumeric notes are those which take up the majority of the space in the equally proportioned subdivisions located between two subdivision lines. Full-size alphanumeric notes are played for the full duration of the proportional subdivision within the measure. Reduced-size alphanumeric notes are those which do not take up the majority of the spacing and are consequently smaller in font size in comparison to a full-size alphanumeric note. These reduced-size alphanumeric notes are only played for a portion of the subdivision proportional to their font size, wherein a note which is half the font size of a full-sized alphanumeric note would be played for only half the duration of the full-sized alphanumeric note. Since reduced-size notes are smaller in size physically, more of them may be accommodated within an individual subdivision. Notes sustained for longer than a single subdivision may be extended by representing the extended duration alphanumeric note as a full-size alphanumeric note and adding a tone extension symbol after the extended duration alphanumeric note, wherein said extended duration symbol extends between two or more subdivision lines following the extended duration alphanumeric note.

In another form of the invention, the musical notation system comprises a method for visually representing music to be played on a stringed instrument and provides a tablature staff divided into individual measures by segmenting the staff with measure lines, wherein each measure is then further divided into equally proportioned subdivisions within the measure using subdivision lines. Measure lines are distinguished from subdivision lines by making them a thicker weight or darker than said subdivision lines. A set of string lines intersect the subdivision and measure lines of said tablature staff. A hand position key is also provided which indicates the specified placement of the root finger on the fretboard of a stringed instrument. A finger spacing guide is further provided which indicates the specified spacing of individual fingers on the fretboard.

A plurality of alphanumeric notes representing notes to be played on a stringed musical instrument is then printed between the subdivision lines of a measure on the tablature staff and on top of the provided string lines. The user's finger placement is defined by a finger posture key which specifies the individual's finger posture on the fingerboard and a finger location indicator which locates the index finger of the musician's hand along the length of the fingerboard. An alphanumeric note of '0' indicates that the corresponding string covered by the '0' is to be played with no finger depressed against the fretboard. An alphanumeric note of '1' represents the placement of an index finger on the corresponding string according to the finger posture key, and that said string should be depressed and played. An alphanumeric note of '2' represents the placement of a middle finger on the corresponding string according to the finger posture key, and that said string should be depressed and played. An alphanumeric note of '3' represents the placement of a ring finger on the corresponding string according to the finger posture key, and that said string should be depressed and played. An alphanumeric note of '4' represents the placement of a pinkie finger on the corresponding string according to the finger posture key, and that said string should be depressed and played. An alphanumeric note of 'T' or 'P' represents the placement of a thumb on the corresponding string according to the finger posture key, and that said string should be depressed and played. An alphanumeric note of 'X' represents a physical extension of a finger resulting in a half-step chromatic rise in pitch. An alphanumeric note of '♭' represents a physical extension of a finger resulting in a half-step chromatic decrease in pitch.

The finger location indicator, which is often a number offset from the tablature staff and is identified through a shaded shift indicator bar passing across the tablature staff indicates the location of the index finger along the length of the fingerboard. The finger location indicator and shift indicator bar indicate that a new root or index finger position is to be assumed along a fingerboard, repositioning the fingers 1-4 and (T) thumb, thereby changing the pitches which will be played when the corresponding numbered fingers 1-4 and T are placed on the fingerboard in their new location.

A plurality of alphanumeric notes is then printed onto the tablature staff in the equally proportioned subdivisions created by the subdivision lines. An alphanumeric note printed thereon represents a tone to be played on a corresponding stringed instrument. The duration of play for each alphanumeric note is indicated by the font size of the alphanumeric notes relative to the spacing between a measure's subdivision lines. Full-size alphanumeric notes are those which take up the majority of the equally proportioned subdivision between the division lines. Full-size alphanumeric notes are played for the full duration of the proportional subdivision within the measure. Reduced-size alphanumeric notes are those which do not take up the majority of the spacing and are consequently smaller in font size in comparison to a full-size alphanumeric note. These reduced-size alphanumeric notes are only played for a portion of the subdivision proportional to their font size, wherein a note which is half the font size of a full-sized alphanumeric note would be played for only half the duration of the full-sized alphanumeric note. Since reduced-size notes are physically smaller, more of them may be placed within a subdivision. Notes sustained for longer than a single subdivision may be extended by representing the extended duration alphanumeric note as a full-size alphanumeric note and adding a tone extension symbol after the extended duration alphanumeric note, wherein said extended duration symbol extends between two or more subdivision lines following the extended duration alphanumeric note.

In yet another form of the invention the musical notation system comprises a method for visually representing music to be played on a keyed musical instrument and provides a tablature staff divided into individual measures by segmenting the staff with measure lines, wherein each measure is further divided into equally proportioned subdivisions within the measure using subdivision lines. Measure lines are distinguished from subdivision lines by making them a thicker weight or darker than said subdivision lines.

A set of key lines intersect the measure and subdivision lines of said tablature staff and correspond to a set of keys on a corresponding keyed instrument. A plurality of alphanumeric notes are then printed onto the tablature staff and are located between the beat subdivision lines. An alphanumeric note printed thereon represents a tone to be played on the corresponding keyed instrument. The duration of play for each alphanumeric note is indicated by the font size of the alphanumeric notes relative to the equally proportioned subdivisions created in the spacing between a measure's subdivision lines. Full-size alphanumeric notes are those which take up the majority of the equally proportioned subdivision between the division lines. Full-size alphanumeric notes are played for the full duration of the proportional subdivision within the measure. Reduced-size alphanumeric notes are those which do not take up the majority of the spacing and are consequently smaller in font size in comparison to a full-size alphanumeric note. These reduced-size alphanumeric notes are only played for a portion of the subdivision proportional to their font size, wherein a note which is half the font size of a full-sized alphanumeric note would be played for only half the duration of the full-sized alphanumeric note. Since reduced-size notes are physically smaller, more of them may be accommodated within an individual subdivision. Notes sustained for longer than a single subdivision may be extended by representing the extended duration alphanumeric note as a full-size alphanumeric note and adding a tone extension symbol after the extended duration alphanumeric note, wherein said extended duration symbol extends between two or more subdivision lines following the extended duration alphanumeric note.

In yet another form of the inventive method, the tablature includes alphanumeric notes which are colored to differentiate polyphonic voices, wherein alphanumeric notes representing one voice are depicted in a first color, and wherein alphanumeric notes representing another voice are depicted in a second color.

In an additional form of the inventive method, when the tablature includes alphanumeric notes representing a repeating pattern within a musical work, the repeating pattern may be demarcated by a pattern slur. Although a pattern slur is similar in physical shape to slurs in traditional music notation, the pattern slur in the inventive method is distinguished by grouping all patterns of identical form with slurs of the same color, where different patterns are assigned different colors. Unlike slurs in traditional music notation, a pattern slur does not indicate that notes are to be played together smoothly, or in the case of bowed instruments, in a bow stroke motion moving in the same direction.

In a further form of the inventive method, the tablature includes at least one isomorphic font assigned to an alphanumeric note, wherein the shape or style of the selected font indicates the musical manner in which the corresponding tone is to be played. This form may also be paired with a style key providing a textual explanation of the isomorphic font's musical style.

In yet another form of the inventive method, the font of the alphanumeric notes may vary in opacity or thickness to indicate the dynamic volume of the note. In this form, for example, a bold font indicates that an alphanumeric note is to be played forte, a regular font indicates that an alphanumeric note is to be played at a mezzopiano intensity, and a lightweight font indicates that an alphanumeric note is to be played piano. This form may be paired with a style key providing a textual explanation of the isomorphic font's musical style.

In another form of the inventive method, the inventive tablature can be used to sculpt new songs. This is accomplished through the steps of selecting a first musical chord, then populating several of the tablature's equally proportioned subdivisions with the alphanumeric notes comprising said first musical chord. Then, a second musical chord is selected from a set of chords to form a chord progression and more of the equally proportioned subdivisions of said tablature staff are populated with alphanumeric notes comprising said second musical chord. Once the tablature is populated with notes from the selected chords, the work is considered pre-populated, and the next step may occur, wherein zero, one, or multiple alphanumeric notes are eliminated from each of the subsequent equally proportioned subdivisions until all equally proportioned subdivisions have been processed. This yields a sculpted song which is harmonically compatible with any other sculpted song originating from the same pre-populated work.

In still another form of the inventive method, the tablature method with alphanumeric notes may be mathematically evaluated for its musical complexity through the steps of populating the tablature staff with a plurality of alphanumeric notes forming a completed musical work and then assigning one cognitive load unit to each of the following: each alphanumeric note; each alphanumeric rest; each rhythm change; each mechanical operation required by the left hand, and each mechanical operation required by the right hand; each note assigned a specific mood; and each note assigned a vocal part. These Cogs, or cognitive load units, are then summed to create a complexity index which is printed on the musical work. Additionally, this complexity index may further be divided by the total number of alphanumeric notes and alphanumeric rests in the work and then multiplied by one or more tempos to create a range of cognitive indices. The cognitive index is a mathematically precise indicator of the difficulty of the musical work at the given tempos. As with the complexity index, the cognitive indices are also printed onto the musical work.

Further, the complexity index may be reduced by evaluating each individual alphanumeric note for its number of cognitive load units. Next, at least one musically equivalent fingering is selected (i.e., those that produce identical tones) and the note's cognitive load units calculated. The original rendering and the musically equivalent fingering are then compared and the rendering with the least number of cognitive load units is selected, indicating the note is rendered in its simplest form. The remaining alphanumeric notes are similarly evaluated until the musical work is processed transforming the musical work into a simpler format through the minimization of the cognitive index.

BRIEF DESCRIPTION OF THE DRAWING FIGURES

Other advantages of the present invention will be readily understood by reference to the following detailed description in connection with the accompanying drawings wherein.

DESCRIPTION OF THE VARIOUS EMBODIMENTS

Figure 2:
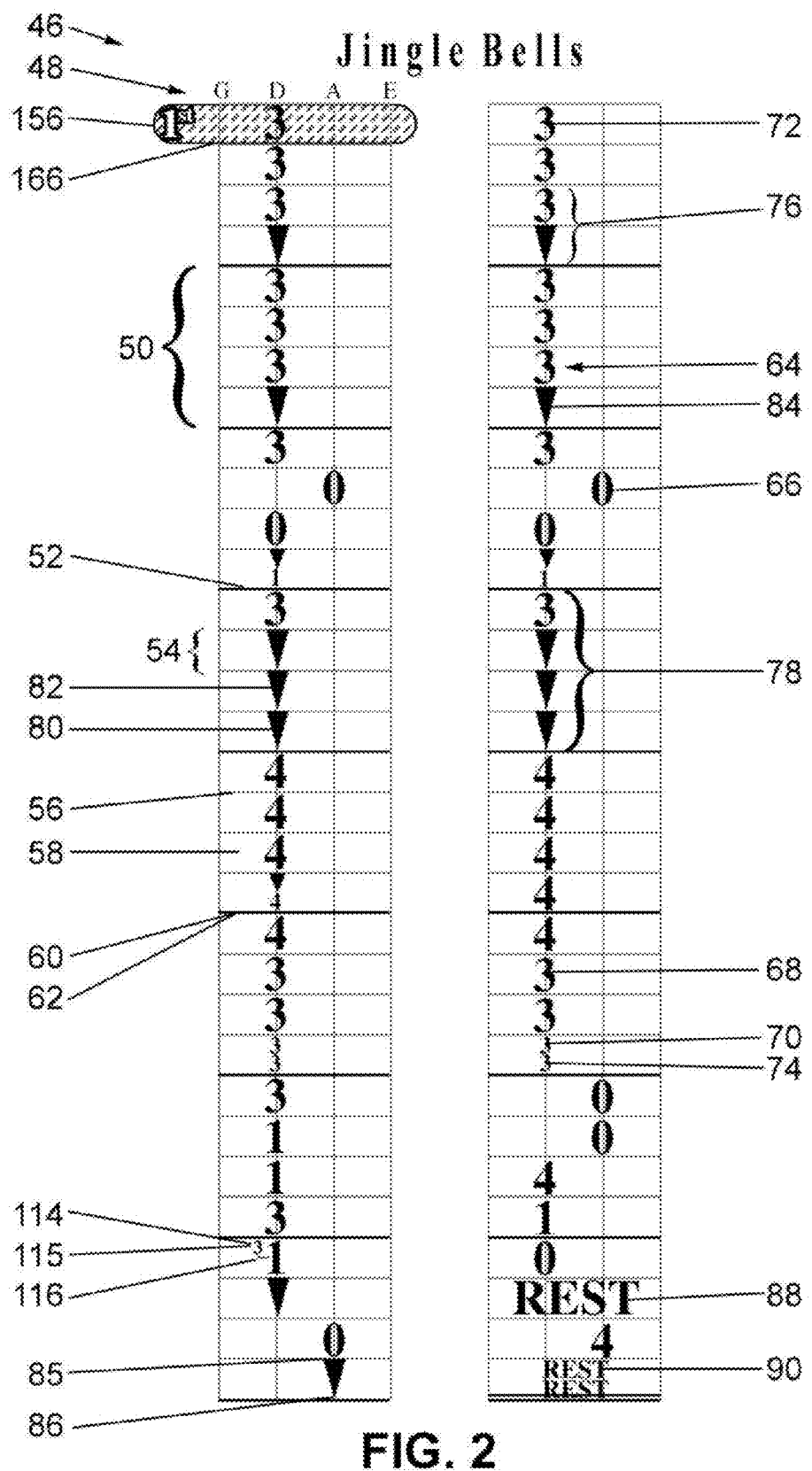
FIG. 2 is a perspective view of the song 'Jingle Bells' rendered on a tablature staff using alphanumeric notes according to one form of the inventive method.

For purposes of the following description, the terms "upper," "lower," "right," "left," "top," "bottom," "horizontal," "vertical" and derivatives of such terms shall relate to the tablature staff as oriented in FIG. 2. However, it is to be understood that the invention may assume various alternative orientations and configurations including vertical and horizontal orientations, and is not to be considered limiting except where expressly specified to the contrary. It is also to be understood that the process illustrated in the attached drawings and described in the following specification are simply exemplary embodiments of the inventive concepts described herein. Specific dimensions and other physical characteristics relating to the embodiments disclosed herein are not to be considered limiting unless expressly stated otherwise.

Figure 1:
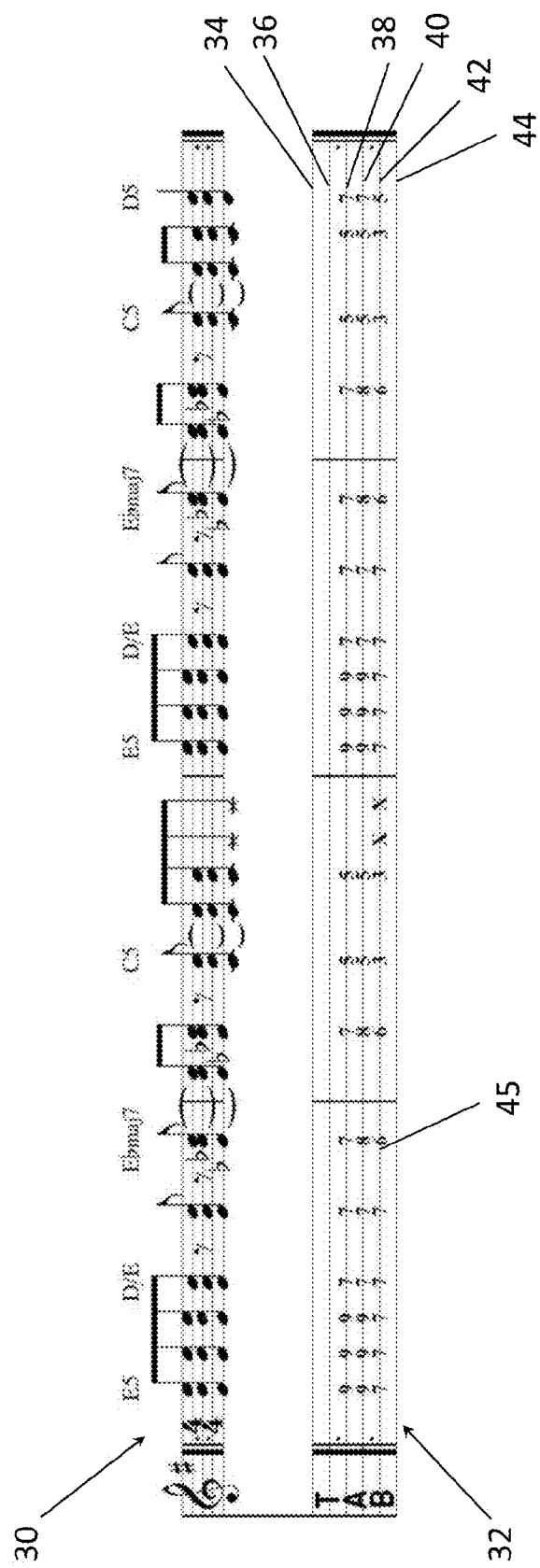
FIG. 1 is a perspective view of a system of prior art standard musical notation and a corresponding system of prior art tablature.

One exemplary prior art musical system is shown in FIG. 1 and includes a form of standard music notation 30 showing notes on a musical staff. FIG. 1 also includes a corresponding example of prior art tablature notation 32 which indicates the specific mechanical operations necessary to create a corresponding tone. The prior art tablature does not specify the individual note's duration, except by correlation to the standard music notation, requiring the standard form 30 to be included to render the rhythm of the tablature 32. Further, the prior art tablature 32 does not distinguish polyphonic musical voices, such as harmonies and melodies. Prior art tablature 32, such as the example presented here, merely depicts the operations to be completed to make a tone, in this case, by indicating a number of strings (34, 36, 38, 40, 42, 44) on a corresponding stringed instrument, such as guitar, and a corresponding fret location along the string. Using this prior art method, the player must translate the shown fret numbers 45 to a corresponding string location while also reading the standard musical form to determine note duration. This requires simultaneous interpretation of both the tablature 32 and the standard musical form 30 in order to derive the necessary musical information, which is both inefficient and more complex than the inventive method.

One form of our inventive method is shown in FIG. 2 at 46, where a tablature staff 48 is constructed. The tablature structure is comprised of a number of measures 50 which are each delineated by measure lines 52. The measures 50 are further divided into a number of equally proportioned subdivisions 54 using subdivision lines 56. Each adjacent pair of subdivision lines 56 indicates one time subdivision of the measure 58. It is preferred to distinguish the measure lines 52 from the subdivision lines 56 by making the measure lines 52 thicker 60 or darker 62. In a preferred form of the invention, the total number of equally proportioned subdivisions of time 54 per measure 50 is correlated with the time signature of the musical work and is called a time subdivision of a measure 58.

Alphanumeric notes 64 represent tones to be played on a corresponding musical instrument. Alphanumeric notes 64 are preferably placed in a time subdivision of a measure 58 by placing them between the subdivision lines 56 on the tablature staff 48. In one form of the invention, the duration of the alphanumeric note 64 is dependent on the font size 66 of the alphanumeric note relative to the spacing of the subdivision lines 56. A note that is played for the full duration of a time subdivision of a measure 58 is represented in a proportionally large font size 66 to fill the majority of the time subdivision of a measure. One example of the inventive system is presented in FIG. 2, where the traditional work is in 4/4 time. In this example, each measure 50 in the inventive tablature system contains three subdivision lines 56, creating four time subdivisions of a measure 58, each pair of subdivision lines 56 represent one quarter of the total measure 50. This allows an alphanumeric note 64 having a duration of up to a one quarter note to be placed between the pair of subdivision lines 56. If the font size chosen uses the majority of the spacing within the time subdivision of a measure 58 it is called a full font alphanumeric notes 68. In FIG. 2, a full font alphanumeric note 68 would represent a quarter note 72 since the time subdivisions of a measure each represent one quarter of the total measure 50 according to the time signature.

Continuing with FIG. 2, there are also two alphanumeric notes 64 which represent eighth notes 74. These reduced size alphanumeric notes 70 are each half the font size 66 of the full font alphanumeric note 68, and are played for half of the duration. The proportionality of the font size 66 indicates the duration of a tone. Through the selection of font sizes proportional to note duration, this inventive system conveys rhythm information unavailable in the prior art.

Tones sustained longer than one time subdivision of a measure 58, such as half notes 76 and whole notes 78 use more than one time subdivision to denote their duration. In these instances, a full font alphanumeric note 68 is shown. Adjacent to the full font alphanumeric note is a tone extension symbol 80. This tone extension symbol 80 extends the duration of a full font alphanumeric note 68 for the duration of the length of the tone extension symbol, or for the sum of the consecutive multiple tone extension symbols 82. In one form of the invention, the tone extension symbol 80 is triangle-shaped 84 with the base portion 85 of the triangle located parallel to a first subdivision line 56 and the vertex 86 of the triangle laying adjacent to a second beat subdivision line 56 or alphanumeric note 64.

An alphanumeric musical rest, marking the absence of a tone, is indicated in the inventive system in FIG. 2 at 88. Similar to the alphanumeric notes 64 for musical tones described above, the duration of an alphanumeric rest symbol 88 is indicated by its font size 66. A rest that is the full duration of a time subdivision of a measure 58 is proportionally large in font size 66 to fill the majority of the time subdivision. Similar to the reduced size alphanumeric notes 70 above, reduced duration alphanumeric rests 90, are sustained for the duration of the time subdivision 58 in which it encompasses. Where an alphanumeric rest symbol 88 is half the font size of a full duration rest symbol, it indicates that the rest is sustained for only half the duration. Using the inventive method, the proportionality of the font size indicates the duration of the rest. For alphanumeric rest symbols 88 extending beyond one time subdivision of a measure 58, the alphanumeric rest symbol 88 is preferably repeated in subsequent time subdivisions 58; however, the tone extension symbol 80 may also be utilized for this purpose.

Isomorphic Fonts

Figure 3:
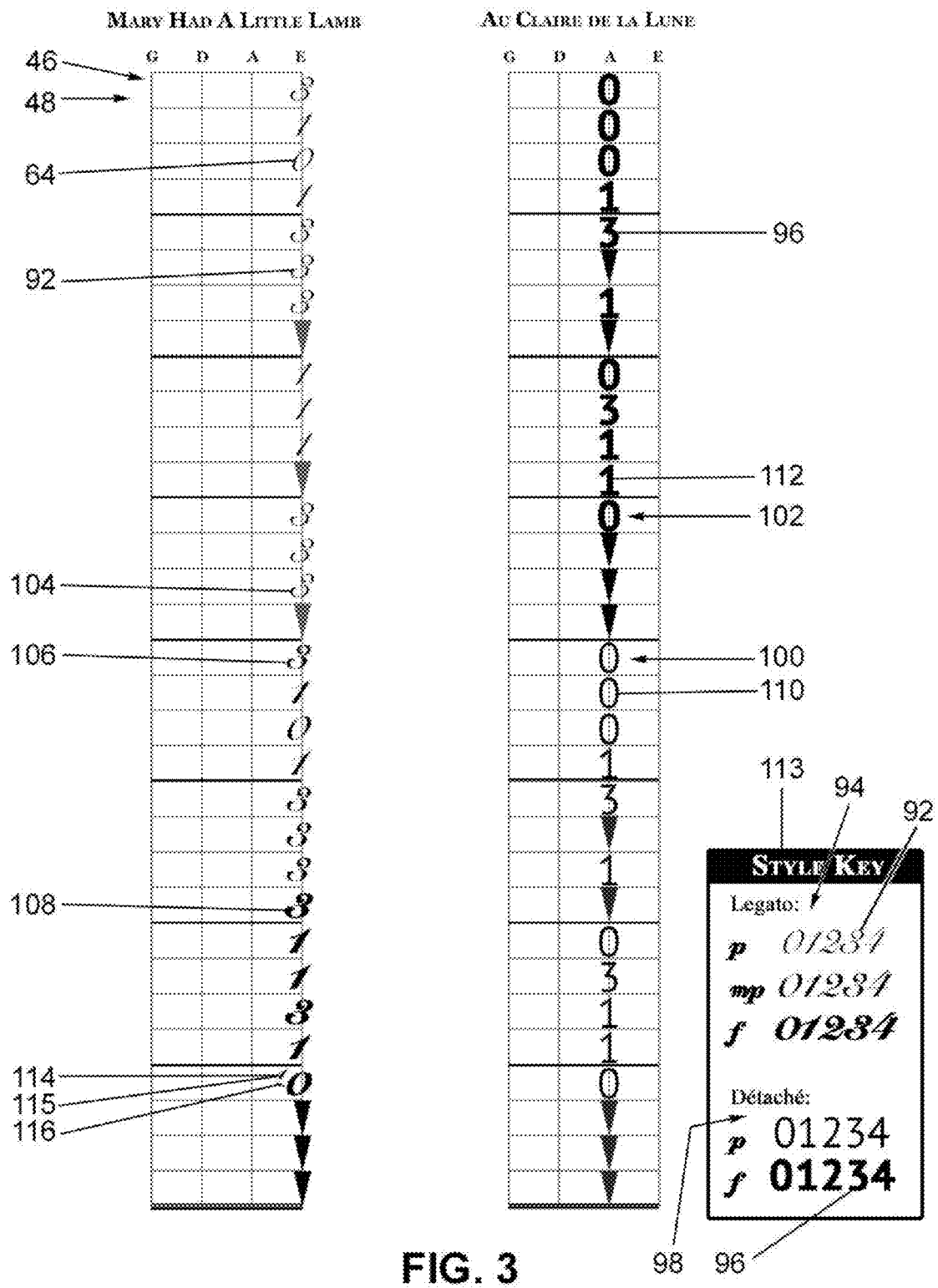
FIG. 3 is a perspective view of the songs 'Mary Had a Little Lamb', and 'Au Claire De La Lune' rendered on a tablature staff according to one form of the inventive method and further includes isomorphism in the musical rendering and dynamic volumes.

The novel system described above uses alphanumeric notes 64 to represent musical tones to be played on a corresponding instrument. Like the preceding example, the font size 66 is varied proportionally to indicate the duration of the rest or tone to be played, however in the next form of the invention, various fonts 92, 96 are utilized. As shown in FIG. 3, the font selection indicates a manner or style of play. By representing the alphanumeric note 64 isomorphically, that is, by choosing a font characterized by a particular shape or line weight, alphanumeric characters indicate the manner in which the corresponding note is to be rendered. For instance, as shown in FIG. 3, the font of Snell Roundhand 92 was selected because it is characterized by smooth and rounded curves 94. This is a visual indicator to the musician that the corresponding note is to be played in a smooth and rounded fashion. In a similar manner, the font of PT Sans 96 is characterized by pointed, rigid, and stiff lines 98 indicating to the musician to play the tone using a pointed, rigid, stiff technique. Similar to the selection of visually suggestive fonts, thinner or thicker line weights to the fonts may be utilized to indicate dynamic volume. FIG. 3 depicts a light font weight 100 indicates a tone to be played at a piano volume, and a bold font weight 102 indicates a tone to be played at a forte volume.

Applying the inventive concept to FIG. 3, the following font set represents increasing volume levels of the legato play style: Piano, Snell Roundhand Regular 104; Mezzopiano, Snell Roundhand Bold 106; Forte, Snell Roundhand Black 108. Further, the following font sets represent increasing volume levels for a détaché play style: Piano, PT Sans Regular 110; Forte, PT Sans Bold 112. The preceding list is not intended to be limiting, and the play styles themselves may be further specified through the use of a style key 113, wherein the play style is assigned a specific font.

FIG. 3 also shows a grace note 114 inserted into a time subdivision of a measure 58. Grace notes 114 are depicted using a superscript font 115 and are offset from an alphanumeric note 64. In this instance, shown in the figure, the grace notes 114 also possess a slur symbol 116 indicating that both the grace note 114 and the adjacent alphanumeric note 64 are rendered in one bow stroke.

Figure 12:
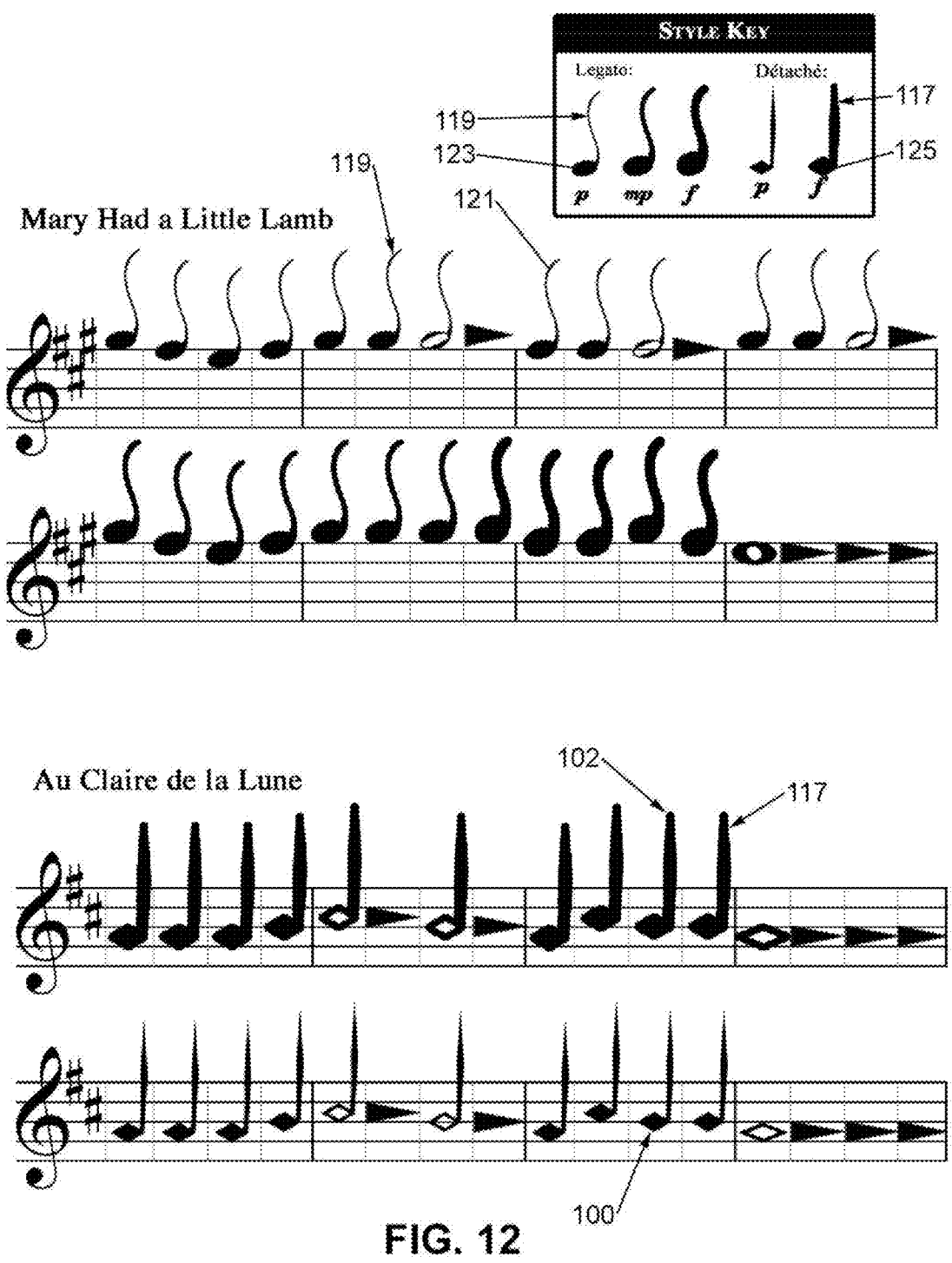
FIG. 12 is a perspective view of an example song rendered with on a traditional musical staff using isomorphic notes according to one form of the inventive method.

Skipping briefly to FIG. 12, this isomorphism is also applicable to traditional music notation through the use of angular 117 and rounded 119 notes, in combination with a style key 113 indicating the musical style. Here, the font selection again indicates a manner or style of play. Representing the notes isomorphically by choosing a font characterized by a particular shape or line weight, the shapes of the notes continue to indicate the manner in which the corresponding note is to be rendered. For instance, as shown in FIG. 12, traditional notes are modified to add isomorphism according to the inventive method creating angular 117 and rounded 119 notes. Curved stems 121 and rounded bases, 123 are a visual indicator to the musician that the corresponding note is to be played in a smooth and rounded fashion. Similarly, notes characterized by pointed, rigid, angular fonts 125 indicate to the musician to play the tone using a pointed, rigid, stiff technique. Continuing with this example, a tenuto play style could be isomorphically rendered by italicizing a given note. Similar to the alphanumeric fonts above, lighter fonts 100 or bold fonts 102 may also be utilized to respectively indicate quieter and louder dynamic volumes.

Tracking Polyphony Through the Use of Colored Alphanumeric Notes

Figure 4:
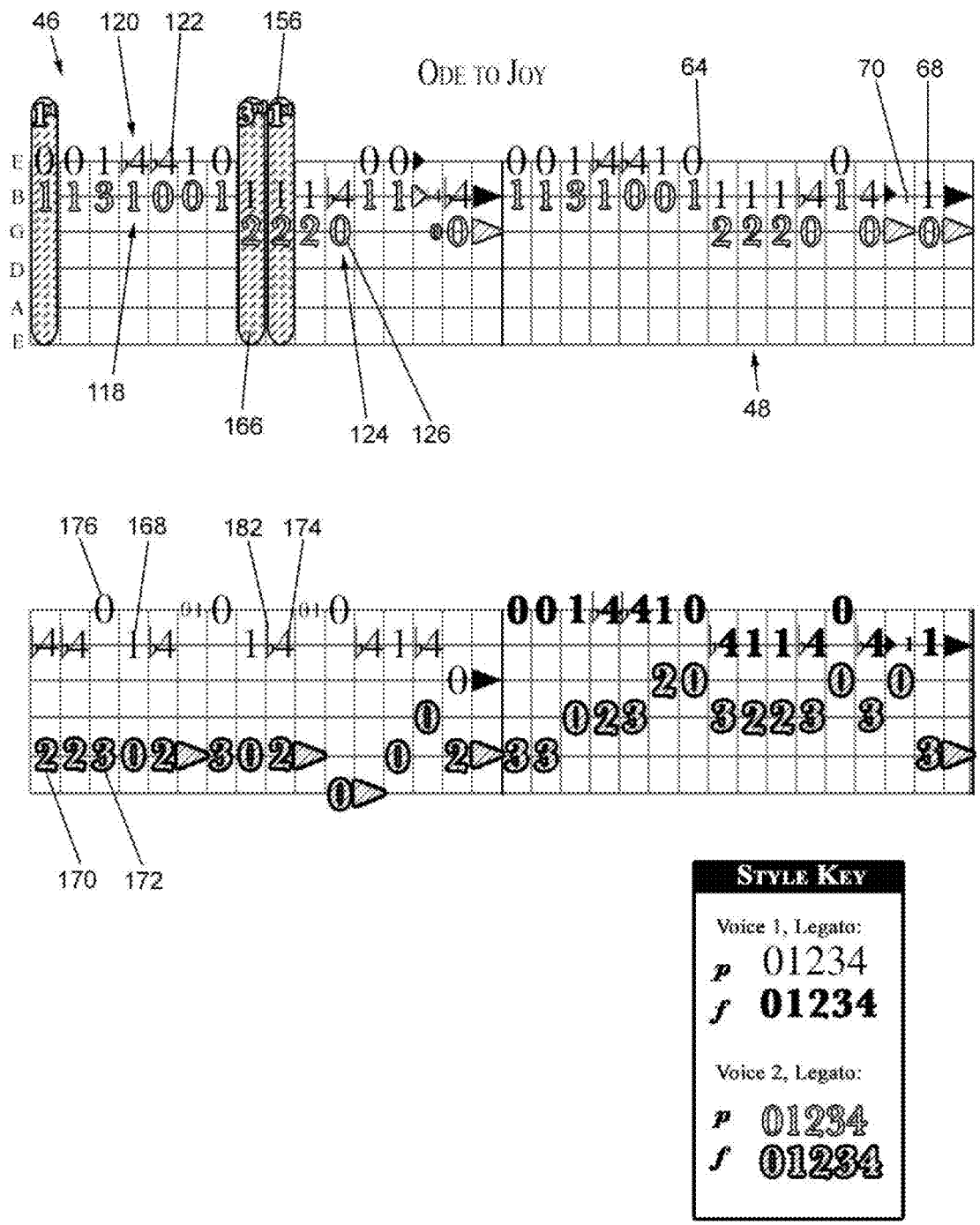
FIG. 4 is a perspective view of the song 'Ode to Joy' rendered on a tablature staff using alphanumeric notes according to one form of the inventive method and which demonstrates polyphony through the use of colors.

One chief drawback of prior art tablature systems, such as shown in FIG. 1, is that they do not explicitly differentiate polyphonic musical voices rendered in the same tablature staff. Standard musical notation likewise fails to explicitly differentiate polyphonic musical voices. However, the inventive musical tablature system bypasses these limitations though the inclusion of colored alphanumeric notes 118. Two polyphonic parts are shown in FIG. 4; the first voice is the melody 120 shown using the color black 122, and the second voice, the harmony 124 is shown using hatch 126. Any colors, such as red, green, blue, black, as well as various hatching and shading styles may be utilized, so long as the voices may be visually distinguished from one another. The colors described herein are merely exemplary and are not intended to be limiting to the method described above.

Pictorial Representations

Figure 5:
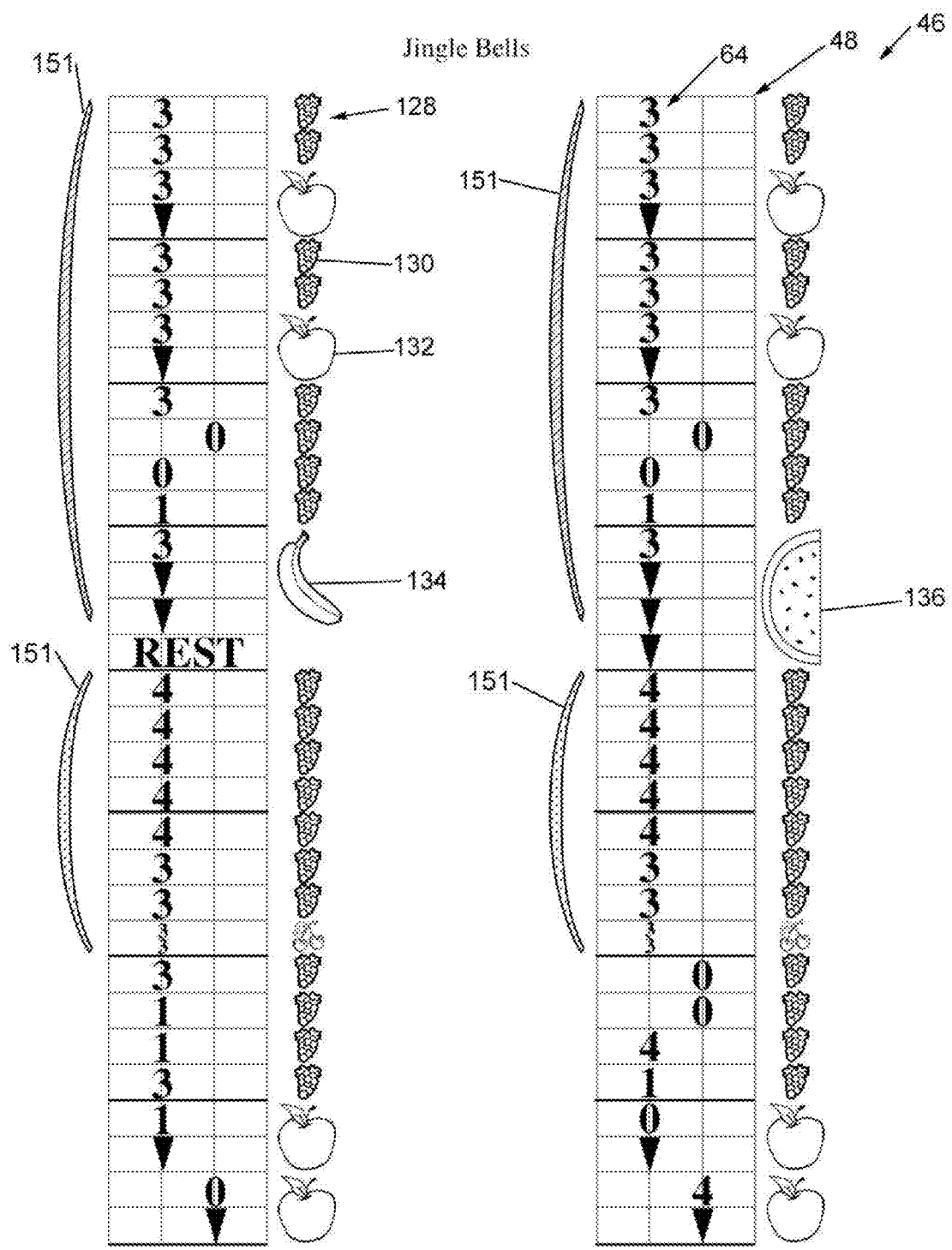
FIG. 5 is a perspective view of the song 'Jingle Bells' rendered on a tablature staff using alphanumeric notes according to one form of the inventive method and demonstrates pictorial representations of the duration of a note and pattern slurs.
Figure 6:
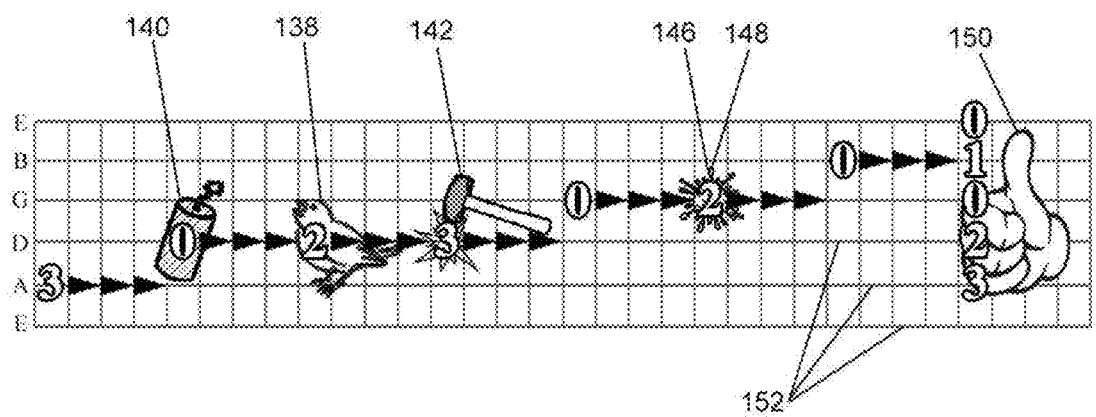
FIG. 6 is a perspective view of a C major scale rendered on a guitar tablature staff using alphanumeric notes according to one form of the inventive method and demonstrates pictographs representing modifications to a note's play styles.

As shown in FIG. 5, pictorial representations of the duration of a note 128 can be included alongside the alphanumeric notes 64. These pictorial representations of a duration of a note 128 further indicate the duration of the font sizes 66 of the adjacent alphanumeric notes 64. The size or length of the duration pictograph 128 indicates the length of play for an alphanumeric note 64. Further, particular to the example shown, the chosen pictographs 128 are named with a number of syllables that correspond to verbal representations of the durations of the tones, e.g. one beat is represented by "grape," 130 whereas a two beat tone is represented by "ap-ple," 132 a three beat tone is represented by "ba-na-na," 134 and a four beat tone is represented by "wa-ter-mel-on" 136. Further, the physical size of the chosen pictographs are also size-proportional to their corresponding note durations, e.g. an apple 132 is larger than a grape 130, a banana 134 is larger than an apple 132, and a watermelon 136 is larger than a banana 134.

Further, pictographs may represent modifications to note play styles in the form of specific musical techniques. A partial listing of techniques includes the following: trills, small birds 138; sforzando, a stick of dynamite 140; and hammer-ons, a hammer 142. Other pictographs may also be placed behind 146 an alphanumeric note 64 to indicate a technique: pizzicato, splatter shapes 148; and golpe, a thumb 150.

Pattern Slurs

Similar to the use of color to show polyphony and fonts to show isomorphism, additional and separate colors added to a traditional slur symbol highlight the presence of a musical pattern. Since these slur symbols are colored and denote the presence of a pattern, they are referred to as pattern slurs, 151, an example of which is shown in FIG. 5 Through the use of a pattern slur 151, the musician can readily recognize a repeated pattern of musical tones.

Stringed Instruments

One application of the inventive method may be applied to stringed instruments. In this application, and as shown in FIG. 2 and in FIG. 8, the tablature staff 48 is divided by a set of string lines 152 passing perpendicularly through the measure 52 and subdivision lines 56 of said tablature staff 48. A finger posture key 154, such as those shown in FIGS. 7A-7G, indicates the correct finger placement along a fingerboard/fretboard of a stringed instrument. The hand position indicator 156 (FIGS. 2 and 8) indicates the position (e.g. first position, third position, etc.) on which the index finger will rest according to standard conventions known in the art. Individual alphanumeric notes are then placed onto the set of string lines in the equally proportioned subdivisions between subdivision lines, wherein the placement of the alphanumeric notes 64 upon individual string lines 158, 160, 162, 164 indicate that a corresponding string (e.g., 34, 36, 38, or 40) of a musical instrument should be played.

Figure 7A:
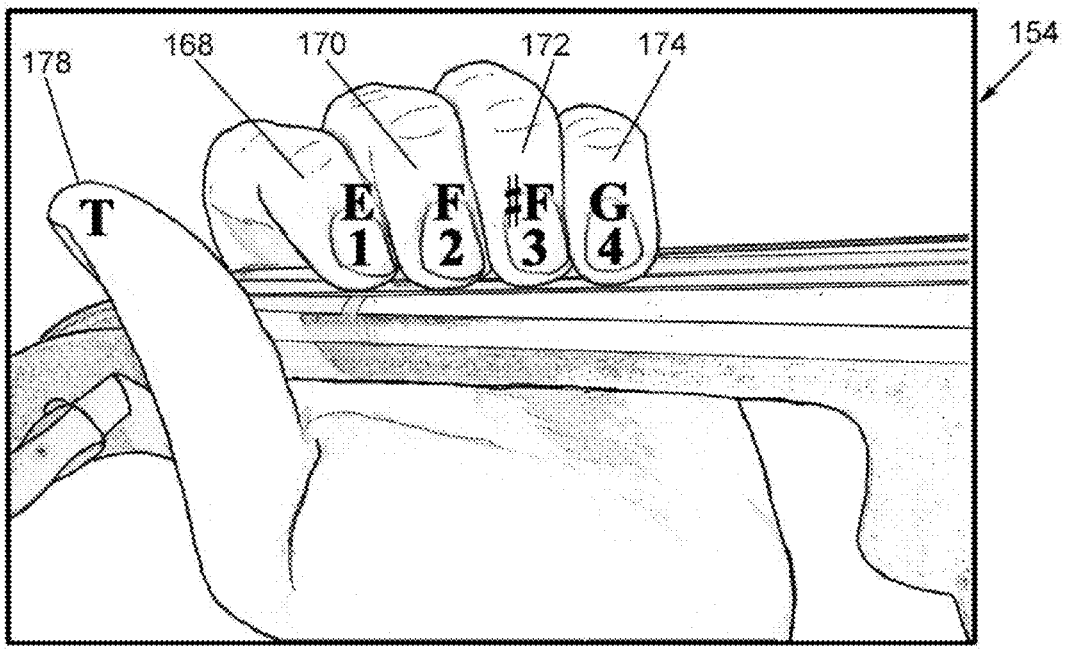
FIG. 7A is a perspective view of a figure posture guide showing chromatic spacing on a violin or viola.
Figure 7B:
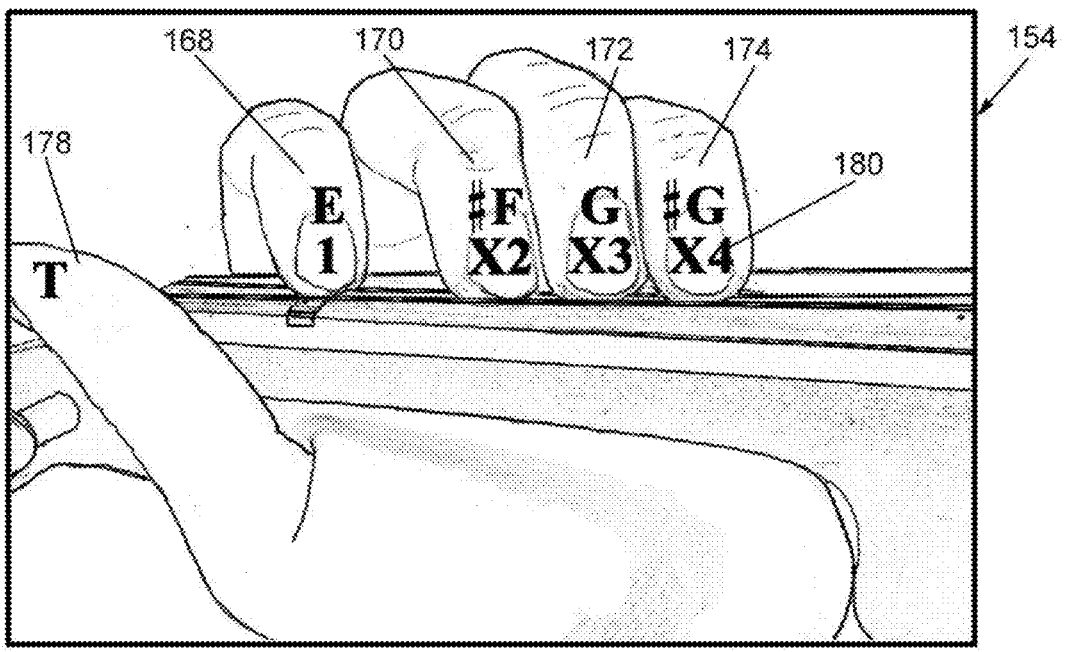
FIG. 7B is a perspective view of a figure posture guide showing alternate finger spacing on a violin through the use of finger extensions, each extension raising the pitch one half-step higher from the chromatic placement.
Figure 7C:
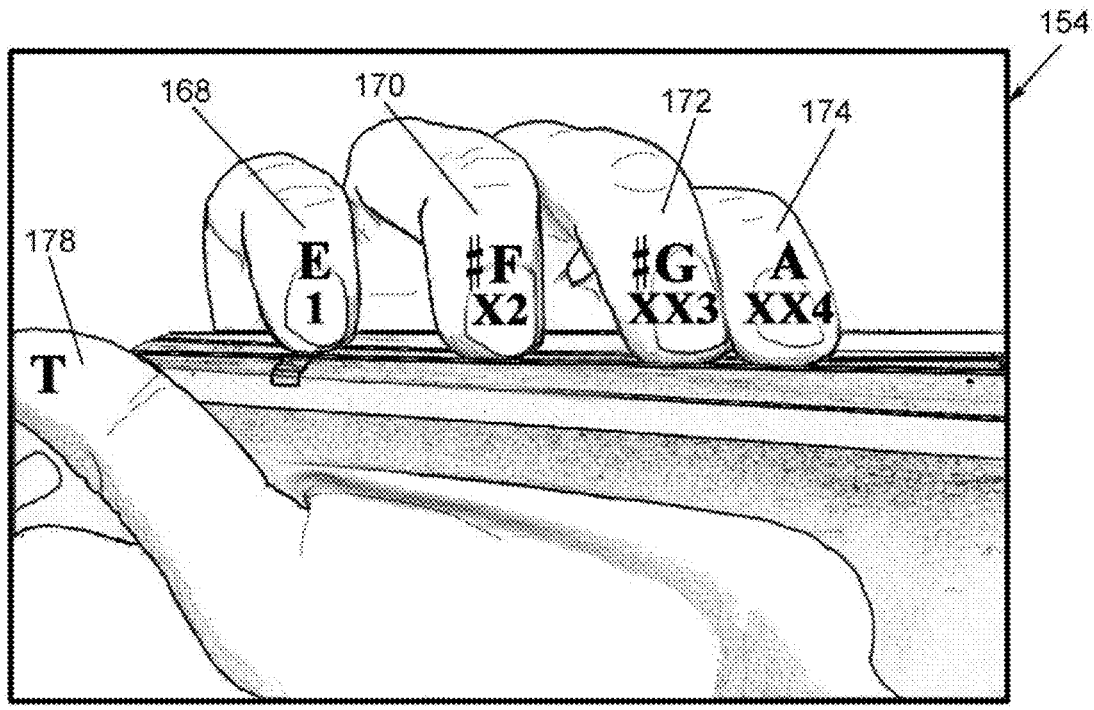
FIG. 7C is a perspective view of a figure posture guide showing another finger spacing on a violin, further demonstrating multiple finger extensions.
Figure 7D:
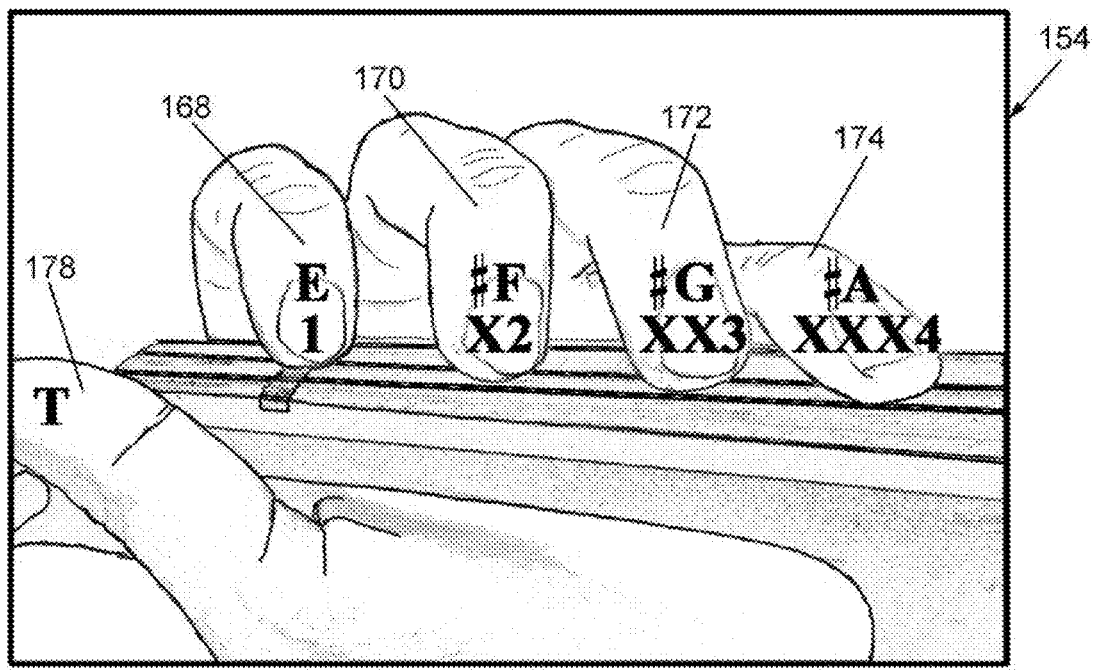
FIG. 7D is a perspective view of a figure posture guide showing yet another alternate finger spacing on a violin, with additional finger extensions.
Figure 7E:
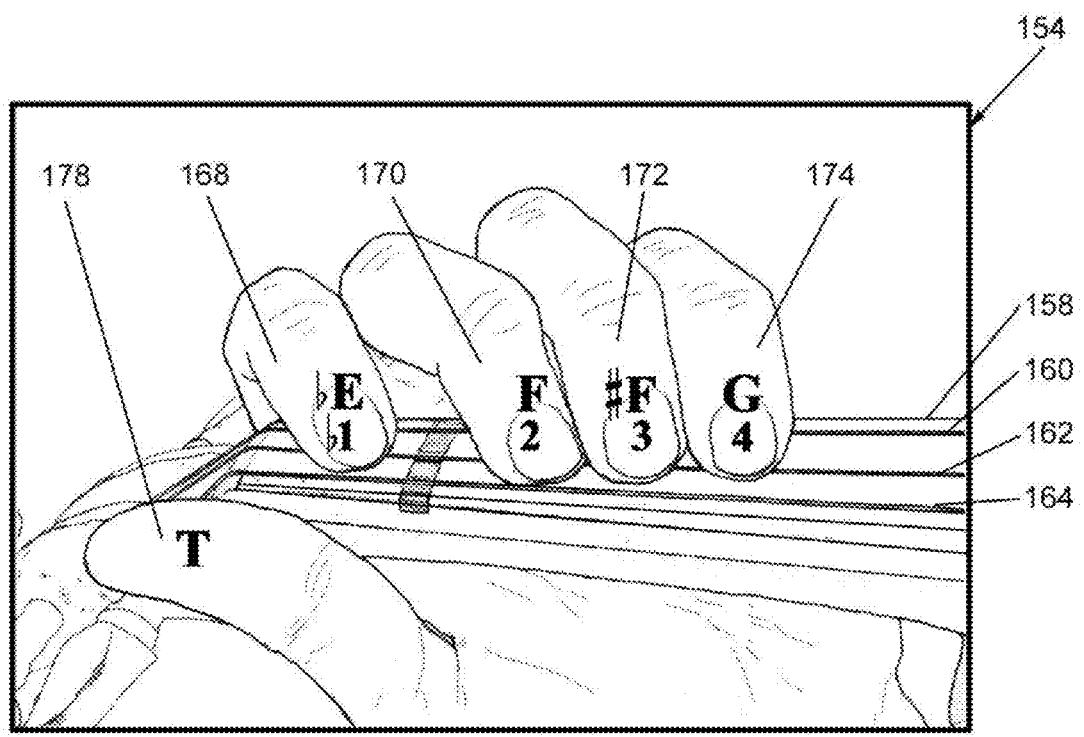
FIG. 7E is a perspective view of a figure posture guide showing an alternate finger spacing on a violin wherein a '♭' indicates a half-step finger extension lowering the pitch one half-step lower from the chromatic placement.
Figure 7F:
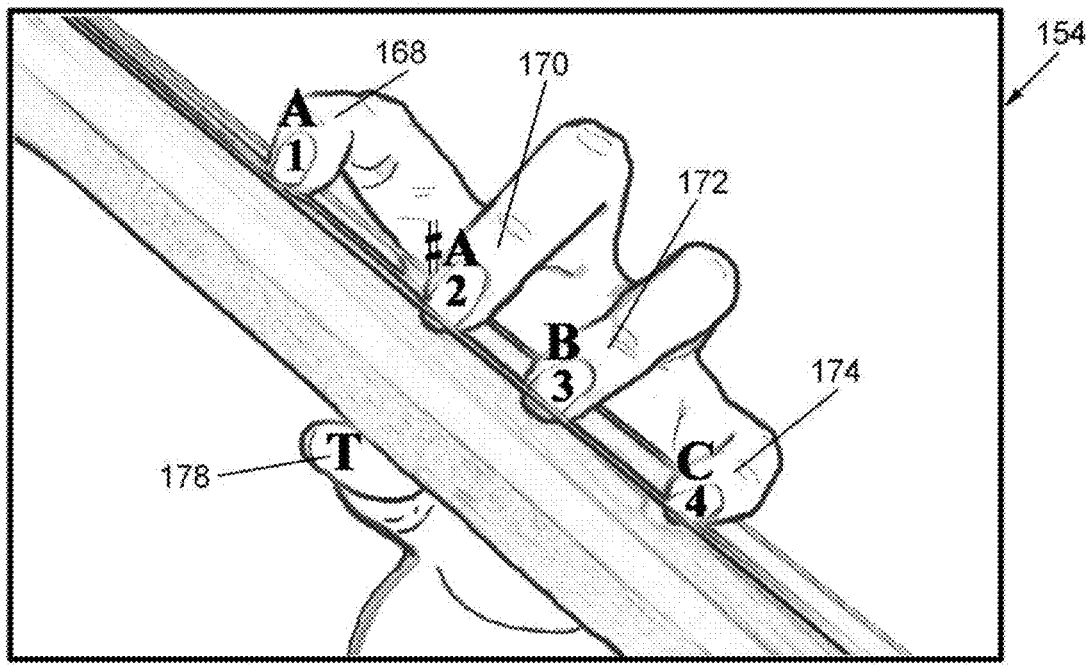
FIG. 7F is a perspective view of a figure posture guide showing chromatic spacing on a cello.
Figure 7G:
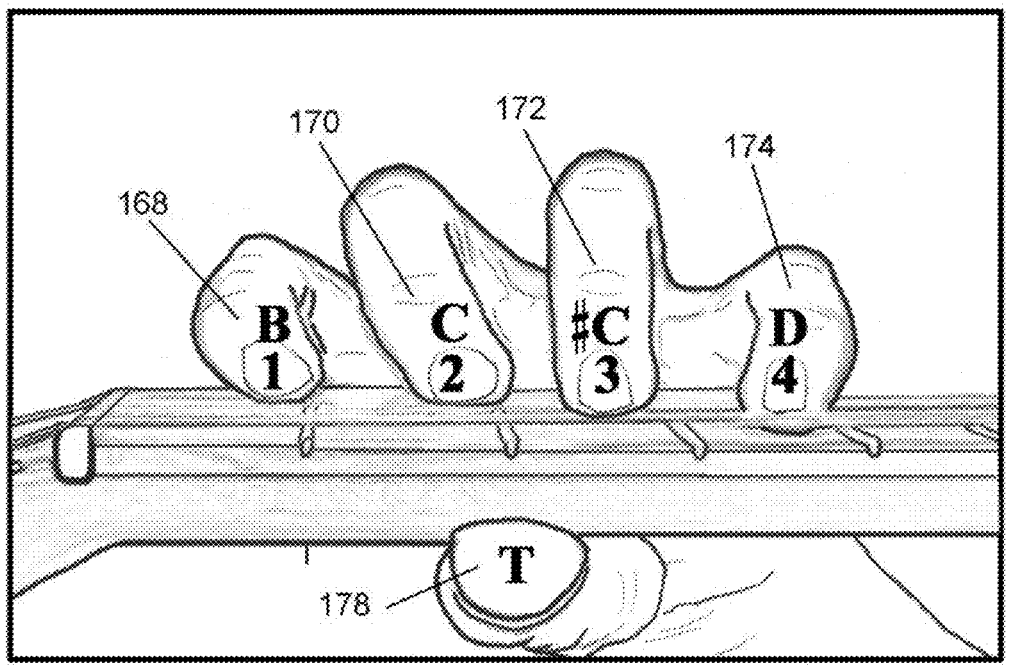
FIG. 7G is a perspective view of a figure posture guide showing chromatic spacing on a guitar.
Figure 8:
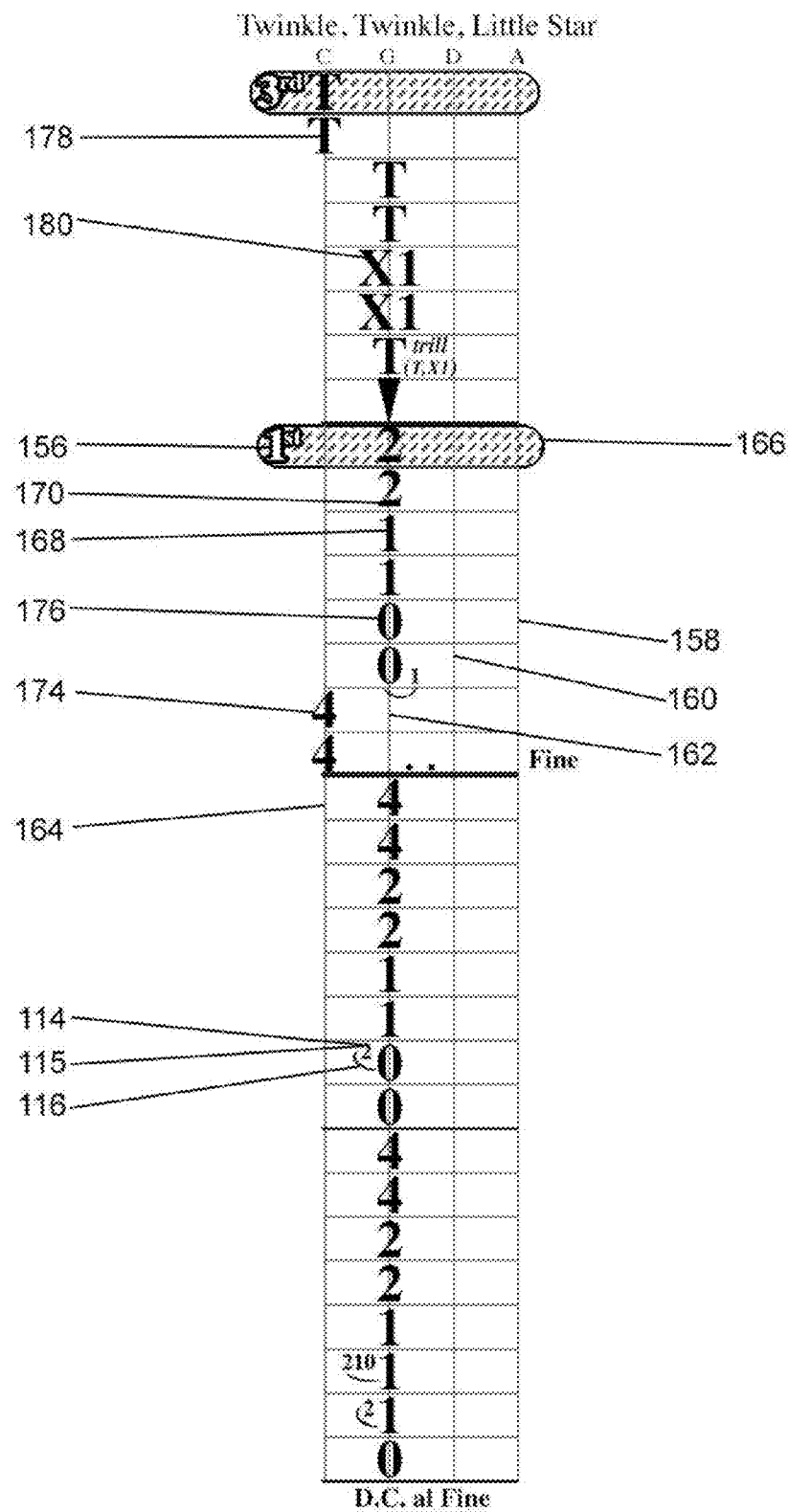
FIG. 8 is a perspective view of the song 'Twinkle, Twinkle, Little Star' rendered on a tablature staff using alphanumeric notes according to another form of the inventive method.

In FIG. 7A, the finger posture key 154 indicates that the musician's fingers are positioned according to the spacing required to produce chromatic pitches in first position on a violin. In a preferred form of the invention both violin, viola and cello use a chromatic finger spacing. This spacing represents an important deviation from that of popular instruction; traditional prior art methods teach the left hand middle finger (finger two) alternates between half and whole steps from the index finger (finger one) as "low two" and "high two"; finger three is adjacent to a high two; and finger four is most often a whole step above finger three. (See FIGS. 7B and FIG. 7C for additional spacing adopted to the inventive method). However, the inventive method can be adjusted to accommodate any variety of fingerings through finger extensions ('X') 180 as set forth below. Chromatic spacing is also preferably used for guitar (FIG. 7G) and cello (FIG. 7F) and for these instruments the figure posture is the widely-used finger spacing customarily expected.

The individual alphanumeric notes 64 are then applied to the tablature staff 48 to indicate which finger to use on the selected string according to the current position on the fingerboard of the musical instrument. In a preferred form of the invention, each musical work begins with the user's hand in the traditional first position, but postured according to the finger posture key 154. As needed throughout the musical work, the position of the user's hand may be updated through the use of a shift indicator bar 166. The shift indicator bar 166 indicates to the musician that the user's index finger is to be moved to a numerical position according to traditional conventions for hand positions; this numerical position is called the hand position indicator 156. For example, on violin, the index finger on the first A on the G string is called first position, whereas the index finger on middle C on the same string is called third position, etc. However, regardless of the repositioning of the hand according to the location indicated by the shift indicator bar 166, the posture of the hand remains the same as is indicated by the figure posture key 154.

Using one form of the method, the specific alphanumeric notes '1' (168), '2'(170), '3' (172), and '4' (174) respectively represent left hand fingers of index (1), middle (2), ring (3), and pinkie (4). These finger numbers are placed onto the tablature staff 48, over top the lines representing the strings (158, 160, 162, 164) of the instrument. These finger numbers indicate that the corresponding finger should depress the string and a tone should be played, thus the numbers 1-4 represent alphanumeric notes 64 placed onto a tablature staff, and more specifically the operation needed to render an associated tone. The alphanumeric note 64 of '0' (176) laid overtop a string line (158, 160, 162, 164) indicates that corresponding string is to be played but not depressed by a finger. The alphanumeric note 'T' (178) represents the placement of a thumb on said corresponding string. In this manner, the inventive method utilizes alphanumeric notes 64 which direct the musician to perform an operation to render a tone. It is important to note that in this method, these alphanumeric notes represent the fingers to use to render a corresponding tone on a string and are not fret numbers as is used with traditional tablature. Thus, a tone change may be accomplished via the shift indicator bar 166 and a new hand position indicator 156 indicating the index finger's new location along the fingerboard. This shift to a new location occurs without altering the finger posture. This allows for a musical pattern (see Pattern Slur 151) to be repeated in different tones without necessarily changing the associated alphanumeric numbers.

The alphanumeric character of "X" (180) preceding the alphanumeric notes '1,' '2,' '3,' '4,' or 'T' (168, 170, 172, 174, 178) indicates an ascending finger extension one half step higher than the position specified in the figure posture key 154. In a preferred form, this indicates that the associated finger number is positioned a half-step higher than its chromatic finger posture. Additional 'X's' (180) indicate further half-step extensions of the denoted finger. For example, an alphanumeric note of 'XX4,' 'XXX4' indicates to the musician to reposition the pinkie finger respectively two half-steps and three half-steps from the index finger. Similarly, an alphanumeric note 64 preceded by one or more alphanumeric symbols '♭' 182 indicates that the associated finger extends a half-step such that the pitch is lowered one half-step from the chromatic placement indicated by the finger posture key 154.

Keyed Instruments

Figure 9:
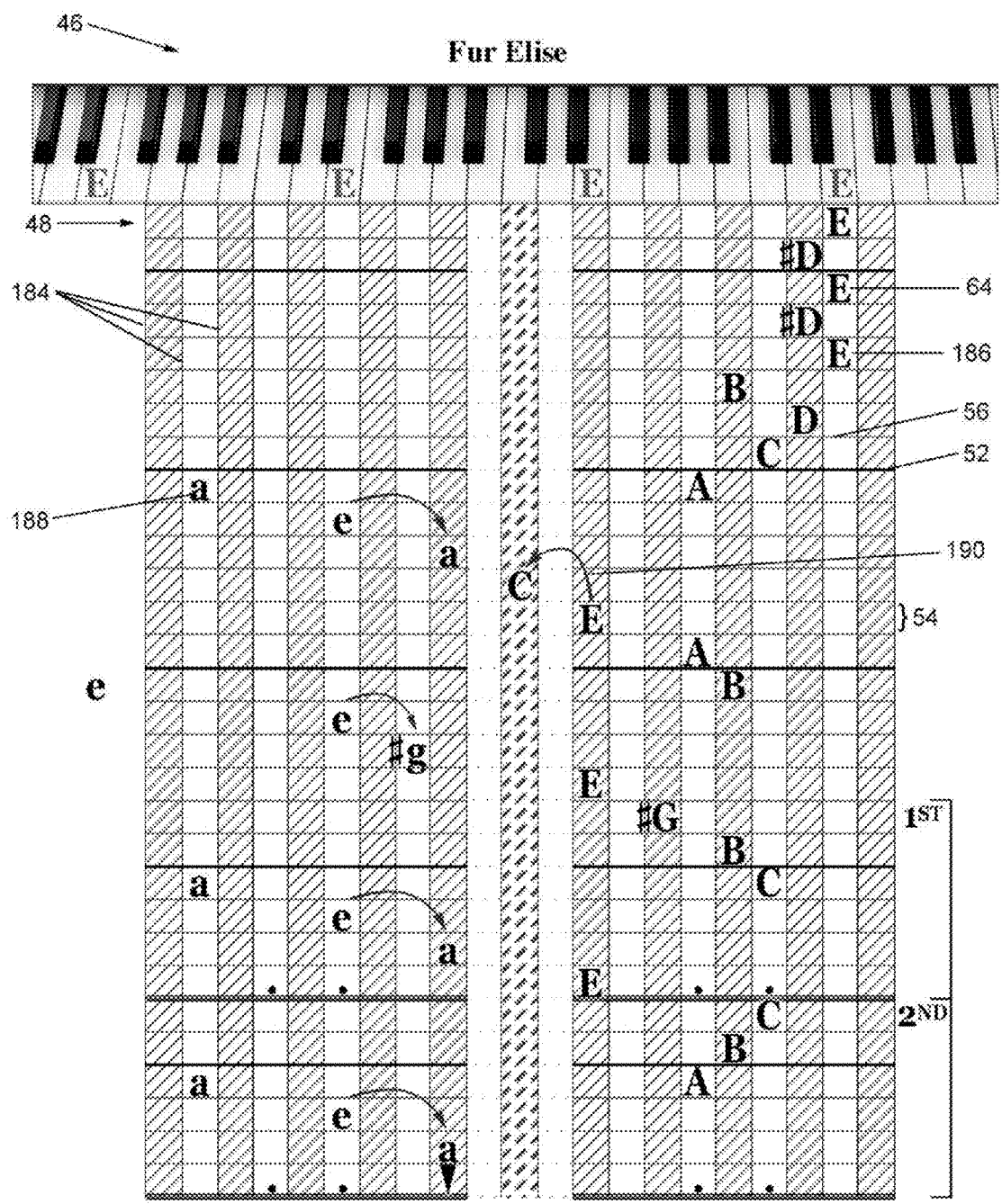
FIG. 9 is a perspective view of the song 'Fur Elise' rendered on a tablature staff for keyboard using alphanumeric notes according to another form of the inventive method.
Figure 10:
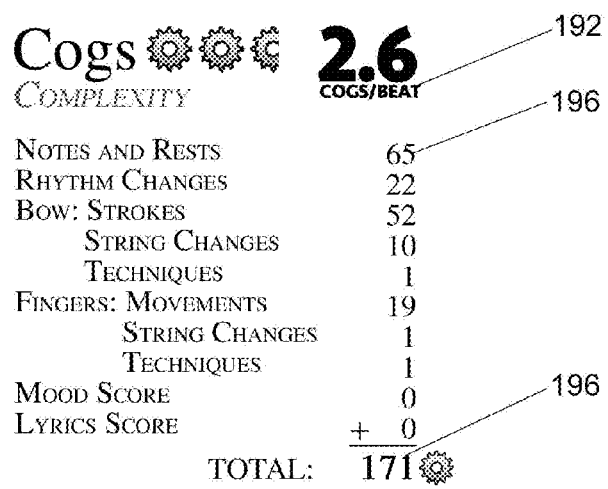
FIG. 10 is a perspective view of a calculation of complexity index and cognitive index for the song "Jingle Bells" as shown in FIG. 2.
Figure 10:
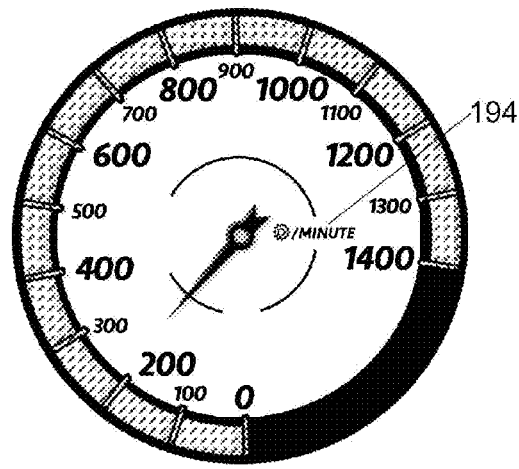

One application of the inventive method may be applied to keyed instruments. In this form of the invention the tablature staff has a set of key lines 184 passing perpendicular through the measure 52 and subdivision lines 56 of said tablature staff 48, wherein the set of key lines correspond to a set of keys on a keyed instrument. In one preferred form of the method, the keys lines 184 represent two or more octaves on a corresponding keyed instrument, wherein the key for middle C is preferably centered in the set of key lines. Additionally, the keys corresponding to notes placed onto the lines of a traditional music staff may be shaded allowing the tablature to visually represent the traditional music staff. This arrangement assists the musician to translate from tablature back to regular music notation by centering the tablature staff 48 to correspond to the bass and treble clefs of traditional music notation 30. As seen in FIG. 9, the key representing middle C is shaded in a different color. The shaded keys to the right of middle C, represent the lines of a treble clef of the grand staff in traditional notation, and the shaded keys to the left of middle C, represent the lines of bass clef of the grand staff in traditional notation. The connection between the inventive staff an the grand staff is easier to visualize when the figure is rotated counter-clockwise 90 degrees, which represents another acceptable form of the inventive notation and is a step toward transitioning to standard musical notation.

Figure 7H:
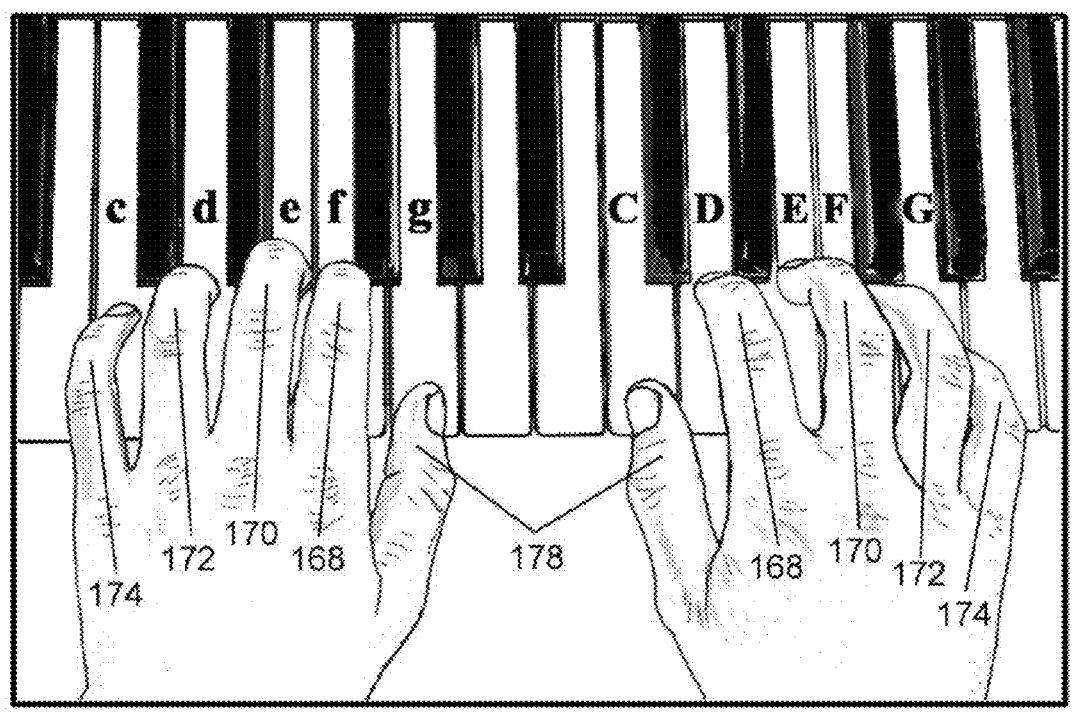
FIG. 7H is a perspective view of a figure posture guide showing chromatic spacing on a piano.

In addition to the tablature staff 48, a finger posture key 154 (FIG. 7H) is provided to indicate the correct finger placement on the keys on the keyed instrument. In this method, the alphanumeric notes 64 are placed onto said tablature staff 48 and indicate that a corresponding key of a keyed instrument should be depressed. In one form of the keyed method, the alphanumeric note of '1' placed on a line indicates the thumb is to play the corresponding key, where the numbers '2', '3', '4', and '5' respectively represent the index (2), middle (3), ring (4), and pinkie (5) fingers. In another form of the invention, the alphanumeric notes may be represented by traditional letter notes corresponding to the instrument's keys (A through G) placed onto the tablature staff indicating that the corresponding key is to be played. In this method, the alphanumeric notes 64, may include uppercase 186 and lowercase characters 188 as shown in FIG. 9, which denote right and left hand's fingers playing the keys. Arrows 190 may indicate a finger crossover on the keyboard. In the example shown in FIG. 9, uppercase letters 186 are to be played with the right hand, and the lowercase letters 188 are to be played with the left hand. This arrangement is not to be considered limiting and any method of differentiating handedness can be used, including hollow and filled alphanumeric notes.

Using the particular stringed or keyed methods described above, it is preferred that the above methods would not use alphanumeric notes above the number '5'. This method allows for the quick recognition of musical patterns and allows the musician to recognize a melody or harmony and move it into a different musical key by simply specifying a new hand location with a shift indicator bar 166. This preserves the musical pattern and allows it to be easily recognized. Through the novel use of a shift indicator bar 166, the inventive method allows for the abandonment of the traditional fret based notation shown in FIG. 1, and allows for improved comprehension.

Assessing Complexity:

It is oftentimes desirable to assess a musical work to determine its performance difficulty relative to other works. Methods of evaluating musical difficulty in prior art are subjective because the precise actions taken to play a musical work are not specified in such a way that each performer plays it the same way. Traditional standard musical notation 30 therefore enables multiple possible renderings of the same song, such that renderings vary in complexity. Since standard notation 30 does not specify the manner of play, it cannot be used to generate a precise numerical value of musical complexity. This makes classifying song complexity more art than science, and at best leaves any attempt to describe musical complexity as vague, pertaining more to a range of possible complexities than one single, definitive complexity assessment.

The inventive system 46, however, describes each physical action required by a musician to perform a work (e.g. whether a finger is in a chromatic hand posture, or whether the finger must extend, and what total number of extensions it must perform, etc., determining the position of the hand and on what string, etc.). Because each physical action is fully described, the system enables assigning a weighted system for each physical action required in the musical piece allowing an unbiased calculation of their cumulative sum. This weighted formula results in a figure that describes a specific musical work's complexity, which we refer to as a complexity index 192. This complexity index 192 is useful in describing the complexity of an individual song. However, since it is mathematically precise, it enables comparison between two or more works thereby allowing for an unbiased mathematically graded leveling of variations of the same song, or graded leveling of different musical works. This is useful for musical instruction because it precisely describes the complexity of a work, improving the standard of assurance that a selected musical work will fall within the range of a student's desired complexity.

It is important to carefully distinguish the terms "complexity" and "difficulty." Complexity here refers to quantifying specific elements which must be rendered and/or deciphered in order to perform a musical work. Difficulty, however, is contingent on complexity, and is determined by the amount of time in which those elements of complexity must be rendered. For example, a song like Jingle Bells might have a complexity score of 60 when rendered at a tempo of 60 beats per minute. However, the same version of Jingle Bells rendered at a tempo of 120 beats per minute would double in difficulty while its complexity remains unchanged. It is for this reason that complexity is represented by a complexity index 192, and difficulty is represented by a cognitive index 194, as described below.

The complexity of a work is mathematically represented by its complexity index 192, where one unit of complexity is called one Cog 196. The complexity index which is calculated by summing the total number of Cogs as follows: The quantity of notes and rests, the quantity of rhythm changes, the quantity of operations by the left hand, the quantity of operations by the right hand, the quantity of notes assigned a mood, and the quantity of notes assigned vocal language. In one form of the invention: +1 Cog point 196 is assigned for each note and rest in the selection; +1 Cog for each rhythm change, +1 Cog for each action of the right hand (such as a finger plucking, bow stroke, depressed key, or string change), +1 Cog for each action of the left hand such as depressing a string or key, +1 Cog for each additional technique specified (staccato, legato, etc.), +1 point for each note specified with a mood, and +1 point for each lyrical note.

In the example of Jingle Bells shown in FIG. 2, the complexity index (192) is 171 Cogs, and is calculated as follows: Notes and rests, +65 Cogs; Rhythm changes, +22 Cogs; Bow strokes, +52 Cogs; Bow string changes, +10 Cogs; Bow techniques, +1 Cog; Finger movements, +19 Cogs; Finger string changes, +1 Cog; Finger techniques, +1 Cog; Mood Score, +0 Cogs; Lyrics Score, +0 Cogs.

The difficulty of a work is represented by its cognitive index 194, which is the complexity index 192 divided by the total number of notes and rests in the work and multiplied by the tempo. Thus, in the above example of Jingle Bells, the 171 Cogs are divided by the 64 notes and rests in the work. This is then multiplied by the tempo in beats per second (Beats Per Minute divided by 60), yielding an average of 2.85 Cogs per second, which is the work's cognitive index 194. This cognitive index 194 is useful for students to readily assess their capability to play a musical work at a specified tempo, yielding a quantitatively explicit method of evaluating the ranges of difficulty of a musical work.

Optimization: Simplifying the Work Utilizing a Musically Equivalent Rendering

Once the standard version of a song has been translated into the inventive tablature method 46 and its total number of Cogs 196 has been calculated, the musical work can be strategically simplified without altering the work's melody or rhythm. The difficulties inherent to more complex key signatures are bypassed by the inventive tablature system because sharps, naturals, and flats are rendered simply as alphanumeric characters 64 indicating finger positions. However, unlike traditional tablature, the inventive method is mathematically precise, allowing for various musically equivalent renderings to be compared. A musically equivalent rendering occurs when alternative physical manipulations can be substituted and which yield the same pitch on an instrument. This allows for the evaluation of various musical equivalent renderings while monitoring their cognitive impact. This allows for the evaluation and selection of a particular finger and hand position that is the most cognitively efficient. Each physical substitution can then be individually evaluated and the rendering with the least total cognitive loading (Cogs) selected. By indexing through a musical work in this method, the total cogitative load will be minimized. This creates a transformed musical work rendered in the musical form easiest to perform on a particular musical instrument. This transformed musical work is then in the form which should be easiest to perform.

Song Sculpting:

Processes for teaching music students to compose music have historically faced obstacles, such as the assumption that students should be at least somewhat musically proficient before attempting to compose, and structuring a learning process in something that is ultimately an artistic endeavor with unique artistic voices. Further, standard music notation is a complex method of encoding tones which a student must comprehend prior to being able to express new creative arrangements. Furthermore, a musician able to perform such complex works by virtue of years of practice developing that skill, upon desiring to compose a new work, most often finds their ability to musically invent is superior to their ability to musically commit to paper; it is a sort of musical illiteracy that they can read with greater skill than they can write. Finally, when such a one emerges who is able to accurately put onto paper the melody from their musical mind, often the final crushing blow occurs when they find they did not imagine the work in a context that enables accompaniment through deliberative harmony, because they invented by individual notes without due attention to chord structures, which vitally frame the architecture of polyphonic composition.

The inventive tablature method 46 may be further utilized to create new musical works through a process called song sculpting. Song sculpting is accomplished through the selection of a musical chord, such C Major. The alphanumeric notes 64 that comprise the selected chord are then applied to the tablature staff 48 in their corresponding string or key locations indicating their corresponding tones. The alphanumeric notes 64 are placed into the time subdivisions of a measure 58 such that a plurality of alphanumeric notes comprising the chord are represented. This pattern of placing characters from a chord is repeated for subsequent time subdivisions.

Another chord, such as G Major, is then selected from a set of compatible chord progressions known in the prior art. At a selected point in the musical work, the original chord is changed over to the new chord. The alphanumeric notes 64 corresponding to the new musical chord is then placed into the time subdivisions of a measure 58 moving forward from that point in the musical work. Additional chords may be selected and additional time subdivisions may be populated filling out the time subdivisions remaining in the musical work.

Figure 11:
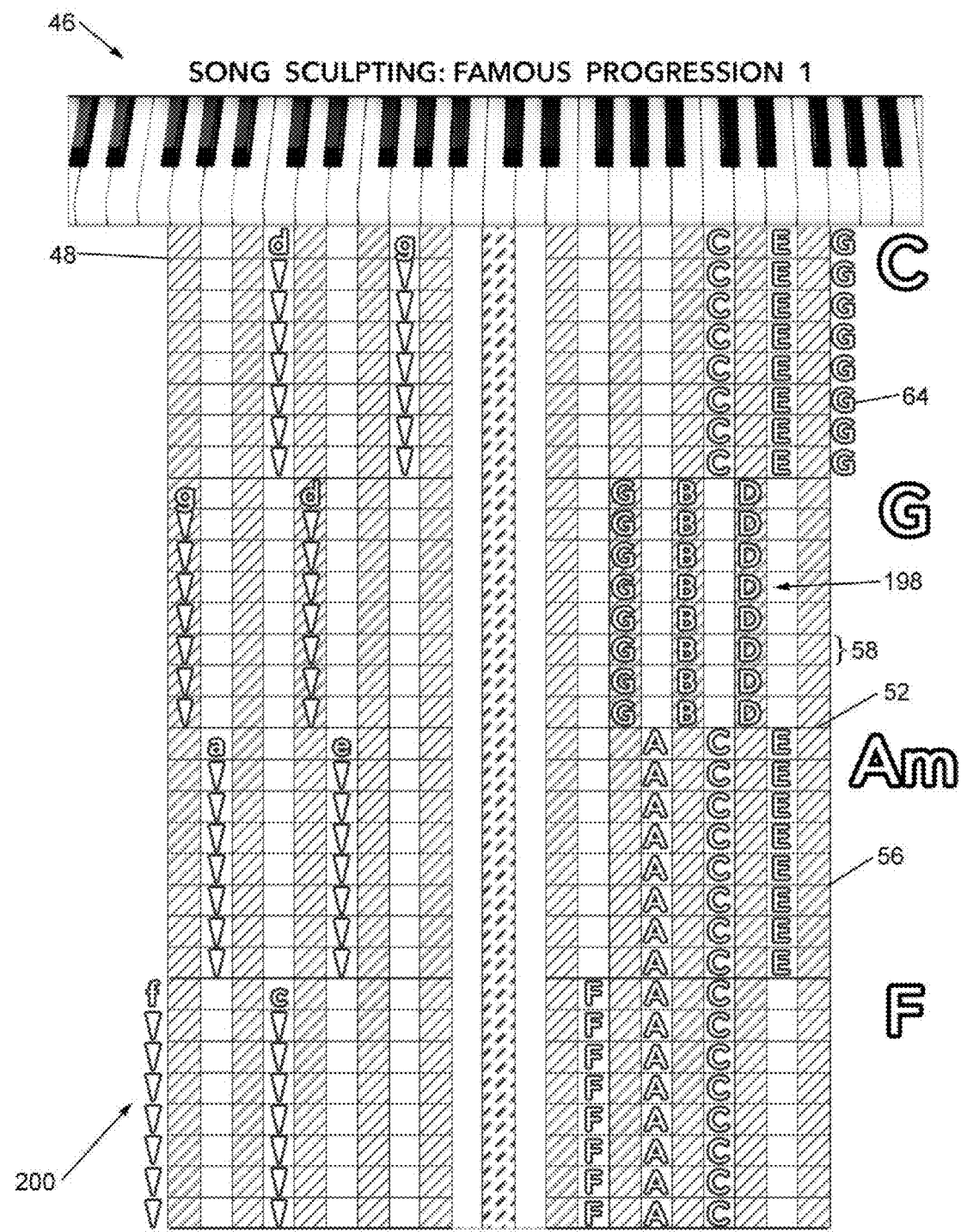
FIG. 11 is a perspective view of a pre-populated musical work for use with song sculpting according to one form of the invention.

The musical work is considered to be pre-populated 198 (FIG. 11) once the musical work's time subdivisions are filled with rests or the alphanumeric notes comprising the selected chords. This form represents the starting point for a sculpted song 200. A student composer then progresses through the pre-populated work 198 and selects one or more rests or alphanumeric characters for each time subdivision. These selected alphanumeric characters remain in the musical work, while the non-selected alphanumeric notes remain unused. The student composer proceeds through the entire musical template in this manner until all time subdivisions have been processed. Upon completion, the work has become a sculpted song 200. Songs sculpted from the same pre-populated 198 musical work will be compatible with any other song sculpted from the same base pre-populated 198 work such that many variations may be constructed and played together creating a distinct but compatible set of musical voices.

The above descriptions are considered that of the preferred embodiments only. Modifications to the invention will occur by those skilled in the art and those who make use of the invention. Therefore, it is understood that the embodiments shown in the drawings and the examples set forth herein are described merely for illustrative purposes, and are not intended to limit the scope of the invention as interpreted according to the principles of patent law, including the doctrine of equivalents.

The invention claimed is:

1. A method for visually representing music to be played on a musical instrument, said
   method comprising the steps of:
   providing a tablature staff representing a portion of a musical instrument, said tablature staff divided into individual measures by segmenting the tablature staff with a set of measure lines thereby creating individual measures;
   providing at least one subdivision line within each individual measure further dividing said measures into equally proportioned subdivisions;
   printing a plurality of alphanumeric notes in the equally proportioned subdivisions; wherein said alphanumeric notes indicates tones to be played on a musical instrument.

2. The method of claim 1 wherein the duration of the tone of said alphanumeric notes is indicated by its font size relative to the size of the equally proportioned subdivisions.

3. The method of claim 2 further comprising providing a tone extension symbol extending the duration of an alphanumeric note beyond the duration indicated by its font size.

4. The method of claim 3 wherein said tone extension symbol is placed into an equally proportioned subdivision located adjacent to an extended duration alphanumeric note.

5. The method of claim 3 wherein said tone extension symbol is triangularly shaped, having a base portion located adjacent to an alphanumeric note, the base portion parallel with a first subdivision line, and having a vertex located near a second subdivision line.

6. The method of claim 2 wherein said plurality of alphanumeric notes further comprises at least one full font alphanumeric note which takes up the majority of space within the equally proportioned subdivision thereby indicating that the tone is to be played for the full duration of time indicated by the proportional subdivision of the measure.

7. The method of claim 6 wherein said plurality of alphanumeric notes further comprises at least one reduced font alphanumeric note, said reduced font alphanumeric note taking less than the majority of the of space within the equally proportioned subdivision thereby indicating that the tone is to be played for less than the full duration of time indicated by the proportional subdivision of the measure.

8. The method of claim 7 wherein the difference in duration between said full font alphanumeric note and said reduced font alphanumeric note is proportional to the difference in font size between said full font alphanumeric note and said reduced font alphanumeric note.

9. The method of claim 1 wherein said set of measure lines is at least one of: thicker or darker than said subdivision line.

10. The tablature staff of claim 1 further comprising tablature lines representing strings or keys on a corresponding musical instrument; and
wherein said subdivision lines lie perpendicular to said tablature lines.

11. The method of claim 1 further comprising the step of printing at least one alphanumeric rest into at least one equally proportioned subdivision of a measure.

12. The method of claim 11 wherein said at least one alphanumeric rest further comprises at least one full font alphanumeric rest which takes up the majority of space within the equally proportioned subdivision thereby indicating that the rests is to be observed for the full duration of time indicated by the proportional subdivision of the measure.

13. The method of claim 12 wherein said alphanumeric rest further comprises at least one reduced font alphanumeric rest, said reduced font alphanumeric rest taking less than the majority of the space within the equally proportioned subdivision thereby indicating that the rest is to be observed for less than the full duration of time indicated by the proportional subdivision of the measure.

14. The method of claim 1 further including the step of placing grace notes into one or more equally proportioned subdivisions; wherein said grace notes are depicted using a superscript font.

15. The method of claim 1 further including the step of placing at least one pictorial representation of the duration of a note alongside at least one alphanumeric note.

16. The method of claim 15 wherein said pictorial representation of the duration of a note has the same number of syllables when pronounced orally as the duration of the alphanumeric note in beats.

17. The method of claim 1 further including the step of placing at least one pictograph adjacent to or underneath said alphanumeric notes denoting a particular musical technique.

18. The method of claim 2, further comprising the steps of:
printing a set of string lines passing perpendicularly through said measure lines and said subdivision lines of said tablature staff;
printing a finger posture key indicating the correct spacing of the fingers along a fingerboard of a stringed instrument;
printing alphanumeric notes onto said set of string lines, wherein the placement of said alphanumeric notes upon a string line indicates a corresponding string of a musical instrument and wherein:
the alphanumeric note of 1 represents the placement of an index finger on said corresponding string according to said finger posture key, and that said string should be depressed and played;
the alphanumeric note of 2 represents the placement of a middle finger on said corresponding string according to said finger posture key, and that said string should be depressed and played;
the alphanumeric note of 3 represents the placement of a ring finger on said corresponding string according to said finger posture key, and that said string should be depressed and played;
the alphanumeric note of 4 represents the placement of a pinky finger on said corresponding string according to said finger posture key, and that said string should be depressed and played;
the alphanumeric note of 0 indicates that said corresponding string is to be played but not depressed.

19. The method of claim 18, further comprising the step of:
providing a finger location indicator specifying the location of the index finger along the length of the fingerboard of the stringed instrument.

20. The method of claim 19 wherein said finger location indicator is a number located adjacent to an alphanumeric note and is not located on a string line.

21. The method of claim 20 further comprising the step of providing a shift indicator bar, wherein the shift indicator bar is: aligned with a proportional subdivision of the measure; aligned with said finger location indicator and is one of: shaded, colored, or outlined.

22. The method of claim 18, wherein the alphanumeric notes of 'T' or 'P' further represents the placement of a thumb on said corresponding string and that said string should be depressed and played.

23. The method of claim 18, wherein the symbol 'X' placed adjacent to an alphanumeric note indicates an ascending finger extension one half-step higher than the finger position specified in said figure posture key.

24. The method of claim 18, wherein the symbol '♭' placed adjacent to an alphanumeric note indicates a descending finger extension one half-step lower than the finger position specified in said figure posture key.

25. The method of claim 2, further comprising the steps of:
printing a plurality of key lines passing perpendicular through said measure lines and said subdivision lines of said tablature staff, wherein each pair of key lines correspond to a key on a keyed instrument;
printing said alphanumeric notes between said keys lines; and
wherein said alphanumeric notes indicates tones to be played on a keyed instrument.

26. The method of claim 25 wherein said tablature staff further comprises the grand staff and wherein Middle C is represented by the centermost key on the tablature staff.

27. The method of claim 25 wherein said plurality of alphanumeric notes shown on said tablature staff are labeled with traditional letter names (A-G).

28. The method of claim 27 wherein alphanumeric notes to be played with a musician's first hand are depicted in lowercase characters and wherein alphanumeric notes to be played with a musician's second hand are depicted in uppercase characters.

29. The method of claim 25, further comprising the step of providing a hand position key indicating the correct hand placement on the keys of a keyed instrument.

30. The method of claim 25 further including the step of placing alphanumeric notes onto said tablature staff, wherein the placement of said alphanumeric notes indicates that a corresponding key of a keyed instrument should be depressed and played, wherein:
the alphanumeric note of 1 represents the placement of a thumb on said corresponding key and that said key should be played;
the alphanumeric note of 2 represents the placement of an index finger on said corresponding key and that said key should be played;

the alphanumeric note of 3 represents the placement of a middle finger on said corresponding key and that said key should be played;

the alphanumeric note of 4 represents the placement of a ring finger on said corresponding key and that said key should be played; and the alphanumeric note of 5 represents the placement of the pinky on said corresponding key and that said key should be played.

31. The method of claim 25 further including the step of placing arrows next to alphanumeric notes to indicate when a user's fingers will cross over one another.

32. The method of claim 25 further including the step of shading or coloring the space between key lines for keys which correspond to lines on the grand staff of traditional music notation.

33. The method of claim 2 wherein alphanumeric notes representing a first musical voice are depicted in a first color, and wherein alphanumeric notes representing a second musical voice are depicted in a second color.

34. The method of claim 2 wherein alphanumeric notes representing a repeating pattern within a musical work are demarcated by a pattern slur.

35. The method of claim 2 wherein one or more of the alphanumeric notes is presented using an isomorphic font which indicates the manner in which the corresponding tone is to be played.

36. The method of claim 35 further including the step of printing a style key; wherein said isomorphic font is listed alongside a textual description of the musical style.

37. The method of claim 35 wherein said isomorphic font varies in opacity or thickness of an alphanumeric note to indicate the dynamic volume of the note.

38. The method of claim 37 wherein said isomorphic font further includes a bold font indicating said alphanumeric note is to be played at a forte intensity.

39. The method of claim 37 wherein said isomorphic font further includes a halftone font indicating said alphanumeric note is to be played at a piano intensity.

40. The method of claim 35 wherein one or more alphanumeric notes utilize rounded fonts to represent a legato musical play style.

41. The method of claim 35 wherein one or more alphanumeric notes utilize hard edged fonts to represent détaché musical play style.

42. The method of claim 2, further comprising the steps of:
selecting a first musical chord;
populating a first plurality of equally proportioned subdivisions of said tablature staff with the alphanumeric notes comprising said first musical chord;
selecting a second musical chord from a set of chord progressions compatible with said first musical chord;
populating a second plurality of equally proportioned subdivisions of said tablature staff with the alphanumeric notes comprising said second musical chord.

43. The method of claim 42, further comprising the steps of:
selecting none, one, or multiple alphanumeric notes for each of the equally proportioned subdivisions of said tablature staff to retain in the work;
retaining only said selected alphanumeric notes in said musical work thereby forming a sculpted song.

44. The method of claim 2 further including the steps of:
populating said tablature staff with a plurality alphanumeric notes forming a completed musical work;
assigning one cognitive load unit to each of the following, if present: each alphanumeric note; each alphanumeric rest; each rhythm change; each mechanical operation required by the left hand, and each mechanical operation required by the right hand; each note assigned a specific mood; and
each note assigned a vocal part;
summing the total number of cognitive load units; and
printing the completed musical work and the total number of cognitive load units.

45. The method of claim 44 further comprising the steps of:
calculating a cognitive difficulty index by dividing said total number of cognitive load units by the total number of alphanumeric notes and alphanumeric rests in the work and multiplying by a musical works suggested tempo; and
printing said cognitive difficulty index.

46. The method of claim 44 further including the step of:
reducing the complexity of a musical note rendered on a tablature staff by calculating the number of cognitive load units needed to render a first alphanumeric note in a first form; attempting an alternate, tonally equivalent rendering for said first alphanumeric note and then calculating the number of cognitive load units for said first form, and again for said tonally equivalent rendering; then selecting one of: said first form or said tonally equivalent rendering by choosing the rendering having the least number of cognitive load units; replacing the first alphanumeric note with the selected rendering; and
repeating the step of reducing the complexity of a musical note for each subsequent alphanumeric note in a musical work, thereby creating a cognitively optimized musical work.

47. A method for visually representing music to be played on a musical instrument, said method comprising the steps of:
providing a tablature staff representing a portion of a musical instrument, said tablature staff divided into individual measures by segmenting the tablature staff with a set of measure lines thereby creating individual measures;
providing at least one subdivision line within each individual measure further dividing said measures into equally proportioned subdivisions;
printing a plurality of alphanumeric notes in the equally proportioned subdivisions; wherein said alphanumeric notes indicate tones to be played on a musical instrument and wherein the duration of the tone of said alphanumeric notes is indicated by its font size relative to the size of the equally proportioned subdivisions;
providing a tone extension symbol extending the duration of an alphanumeric note beyond the duration indicated by its font size;
wherein said plurality of alphanumeric notes further comprises at least one full font alphanumeric note which takes up the majority of space within the equally proportioned subdivision thereby indicating that the tone is to be played for the full duration of time indicated by the proportional subdivision of the measure;
wherein said plurality of alphanumeric notes further comprises at least one reduced font alphanumeric note, said reduced font alphanumeric note taking less than the majority of the of space within the equally proportioned subdivision thereby indicating that the tone is to be played for less than the full duration of time indicated by the proportional subdivision of the measure; and wherein the difference in duration between said full font alphanumeric note and said reduced font alphanumeric note is proportional to the difference in font size between said full font alphanumeric note and said reduced font alphanumeric note.

48. The method of claim 47 further comprising the step of printing at least one alphanumeric rest into at least one equally proportioned subdivision of a measure.

\* \* \* \* \*